US011827389B2

(12) United States Patent
Aston et al.

(10) Patent No.: US 11,827,389 B2
(45) Date of Patent: Nov. 28, 2023

(54) ADDITIVELY MANUFACTURED SATELLITE

(71) Applicant: The Boeing Company, Chicago, IL (US)

(72) Inventors: Richard W. Aston, Brea, CA (US); Christopher David Joe, Arcadia, CA (US); Nicole Marie Hastings, Hermosa Beach, CA (US); Nicole Diane Schoenborn, El Segundo, CA (US); Rachel Elizabeth Zilz, Redondo Beach, CA (US); Arjun Sharma, Culver City, CA (US)

(73) Assignee: The Boeing Company, Arlington, VA (US)

( * ) Notice: Subject to any disclaimer, the term of this patent is extended or adjusted under 35 U.S.C. 154(b) by 203 days.

(21) Appl. No.: 16/877,474

(22) Filed: May 18, 2020

(65) Prior Publication Data
US 2021/0354859 A1    Nov. 18, 2021

(51) Int. Cl.
B64G 99/00 (2009.01)
B33Y 10/00 (2015.01)
B33Y 80/00 (2015.01)
B22F 10/00 (2021.01)
B64G 1/10 (2006.01)

(52) U.S. Cl.
CPC ............. B64G 99/00 (2022.08); B22F 10/00 (2021.01); B33Y 10/00 (2014.12); B33Y 80/00 (2014.12); B64G 1/1007 (2013.01); B22F 2301/052 (2013.01)

(58) Field of Classification Search
CPC ........ B64G 99/00; B64G 1/1007; B64G 1/10; B64G 1/503; B64G 1/22; B64G 1/66; B22F 10/00; B22F 2301/052; B22F 10/25; B22F 10/43; B33Y 10/00; B33Y 80/00; Y02P 10/25
See application file for complete search history.

(56) References Cited

U.S. PATENT DOCUMENTS

| 3,376,684 A | 4/1968 | Cole et al. |
| 3,976,269 A | 8/1976 | Gupta |
| 4,292,375 A | 9/1981 | Ko |
| 4,757,665 A | 7/1988 | Hardigg |
| 5,342,465 A | 8/1994 | Bronowicki et al. |

(Continued)

FOREIGN PATENT DOCUMENTS

| CA | 3023416 C | * 4/2019 | ............ B65D 11/00 |
| CN | 106694884 A | 5/2017 | |

(Continued)

OTHER PUBLICATIONS

Mauduit et al. (doc. "Study of the Suitability of Aluminum Alloys for Additive Manufacturing by Laser Powder Bed Fusion"), . (Year: 2017).*

(Continued)

Primary Examiner — Assres H Woldemaryam
(74) Attorney, Agent, or Firm — Kolisch Hartwell, P.C.

(57) ABSTRACT

A satellite is disclosed, including a body and a communication device attached to the body. The body has an additively manufactured external wall structure at least partially forming an enclosed compartment, and the communication device is configured to receive and transmit data while in space.

20 Claims, 11 Drawing Sheets

(56) References Cited

U.S. PATENT DOCUMENTS

| | | | |
|---|---|---|---|
| 5,958,551 | A | 9/1999 | Garcia-Ochoa |
| 6,064,352 | A * | 5/2000 | Silverman ............ H01Q 1/288 343/912 |
| 6,206,327 | B1 | 3/2001 | Benedetti et al. |
| 6,207,256 | B1 | 3/2001 | Tashiro |
| 7,424,967 | B2 | 9/2008 | Ervin et al. |
| 8,458,976 | B2 | 6/2013 | Chen et al. |
| 9,403,606 | B2 | 8/2016 | Aston et al. |
| 9,475,594 | B2 | 10/2016 | Barber et al. |
| 9,718,566 | B2 | 8/2017 | Field et al. |
| 9,745,736 | B2 | 8/2017 | Wadley et al. |
| 9,796,486 | B1 | 10/2017 | Ilsley et al. |
| 9,828,117 | B2 | 11/2017 | Echelman et al. |
| 10,392,135 | B2 | 8/2019 | Smith et al. |
| 10,407,189 | B1 | 9/2019 | Freestone et al. |
| 10,518,912 | B2 | 12/2019 | Arulf et al. |
| 10,536,107 | B1 * | 1/2020 | Ning .................. H02S 20/30 |
| 10,538,347 | B1 | 1/2020 | Turner et al. |
| 10,556,710 | B2 | 2/2020 | Lancho Doncel |
| 10,589,878 | B2 | 3/2020 | Veto et al. |
| 10,895,015 | B1 * | 1/2021 | Schaedler ............ C23C 10/34 |
| 2004/0074206 | A1 | 4/2004 | Tanase et al. |
| 2006/0107611 | A1 | 5/2006 | Merrifield |
| 2006/0185277 | A1 | 8/2006 | Quincieu |
| 2009/0193749 | A1 | 8/2009 | Gembol |
| 2011/0120080 | A1 | 5/2011 | Schwark, Jr. et al. |
| 2011/0283873 | A1 | 11/2011 | Wadley et al. |
| 2011/0296675 | A1 * | 12/2011 | Roopnarine ............ B64G 1/10 29/700 |
| 2012/0112010 | A1 | 5/2012 | Young et al. |
| 2012/0261515 | A1 | 10/2012 | Smith et al. |
| 2013/0000247 | A1 | 1/2013 | Sypeck |
| 2014/0041231 | A1 | 2/2014 | Andrews |
| 2014/0065433 | A1 | 3/2014 | Lau et al. |
| 2014/0103164 | A1 | 4/2014 | Aston et al. |
| 2014/0131521 | A1 | 5/2014 | Apland et al. |
| 2014/0239125 | A1 | 8/2014 | Aston et al. |
| 2015/0004371 | A1 | 1/2015 | Noble |
| 2015/0017383 | A1 | 1/2015 | Yang et al. |
| 2015/0048209 | A1 | 2/2015 | Hoyt et al. |
| 2015/0175210 | A1 | 6/2015 | Raymond |
| 2015/0298423 | A1 | 10/2015 | Holemans |
| 2016/0031572 | A1 | 2/2016 | Dube |
| 2016/0237836 | A1 | 8/2016 | Harris |
| 2016/0282067 | A1 | 9/2016 | Aston et al. |
| 2016/0288926 | A1 * | 10/2016 | Smith ................. F28D 15/0233 |
| 2016/0325520 | A1 | 11/2016 | Berger |
| 2016/0340061 | A1 | 11/2016 | Bose et al. |
| 2017/0036783 | A1 | 2/2017 | Snyder |
| 2017/0284094 | A1 | 10/2017 | Kim et al. |
| 2018/0106564 | A1 | 4/2018 | Isaacs et al. |
| 2018/0194096 | A1 | 7/2018 | Martial Somda et al. |
| 2018/0194494 | A1 | 7/2018 | Dube |
| 2018/0223947 | A1 | 8/2018 | Shepard et al. |
| 2018/0229443 | A1 | 8/2018 | Pham et al. |
| 2018/0229863 | A1 | 8/2018 | Veto et al. |
| 2018/0251238 | A1 | 9/2018 | Cherrette |
| 2018/0251241 | A1 | 9/2018 | Burt |
| 2018/0281339 | A1 | 10/2018 | Hull et al. |
| 2019/0002133 | A1 | 1/2019 | Peterka, III et al. |
| 2019/0023423 | A1 * | 1/2019 | Grübler ................. B64G 1/443 |
| 2019/0202163 | A1 | 7/2019 | Yeh et al. |
| 2019/0315501 | A1 | 10/2019 | Duong et al. |
| 2019/0337220 | A1 | 11/2019 | Beyerle et al. |
| 2020/0010220 | A1 * | 1/2020 | Fraze ...................... B64G 1/10 |
| 2021/0061495 | A1 | 3/2021 | Aston et al. |
| 2021/0221540 | A1 * | 7/2021 | Panetti ................. B64G 1/1085 |
| 2021/0354856 | A1 | 11/2021 | Aston et al. |
| 2021/0356015 | A1 | 11/2021 | Aston et al. |

FOREIGN PATENT DOCUMENTS

| | | | | |
|---|---|---|---|---|
| CN | 208392799 | U | 1/2019 | |
| CN | 109317677 | A | 2/2019 | |
| CN | 111532452 | A | 8/2020 | |
| EP | 0780294 | A2 * | 6/1997 | ............ B22F 10/00 |
| EP | 3034208 | A1 | 6/2016 | |
| EP | 3333474 | A1 | 10/2017 | |
| EP | 3569396 | A1 * | 11/2019 | .......... B29C 64/106 |
| EP | 3785828 | A1 | 3/2021 | |
| WO | 2017169080 | A1 | 10/2017 | |

OTHER PUBLICATIONS

European Patent Office, Extended European Search Report regarding European Patent Application No. 21214774.8, dated Apr. 21, 2022, 7 pages.

European Patent Office, Extended European Search Report regarding European Patent Application No. 21214809.2, dated Apr. 25, 2022, 9 pages.

U.S. Patent and Trademark Office, Non-Final Office Action regarding U.S. Appl. No. 16/877,477, dated Apr. 14, 2022, 31 pages.

Zhang, Xiaoyu et al. "Vibration tests of 3D printed satellite structure made of lattice sandwich panels." AIAA Journal 56.10 (Oct. 1, 2018): 4213-4217.

European Patent Office, Extended European Search Report regarding European Patent Application No. 20189687.5, dated Feb. 1, 2021, 11 pages.

U.S. Patent and Trademark Office, Non-Final Office Action regarding U.S. Appl. No. 16/554,150, dated Jan. 21, 2022, 33 pages.

Steven M. Huybrechts et al., "Grid Stiffened Structures: A Survey of Fabrication," Analysis and Design Methods, 1999, 10 Pages, Space Vehicles Directorate, Air Force Research Lab, Kirtland AFB, New Mexico, and Boeing Space and Defense, The Boeing Company, Seattle, Washington.

Peter Torvik, "Analysis of Free-Layer Damping Coatings," Key Engineering Materials, Mar. 15, 2007, 22 Pages, vol. 333, Trans Tech Publications, Switzerland.

Christian Carpenter, et al. "Test Results for the MPS-120 and MPS-130 CubeSat Propulsion Systems." Aerojet Rocketdyne, 2014, 32 pages.

Braden Grim et al., "MakerSat-o: 3D-Printed Polymer Degradation First Data from Orbit," ResearchGate Conference Paper, Aug. 2018, 7 pages.

Elwood Agasid et al., "State of the Art Small Spacecraft Technology," Small Spacecraft Systems Virtual Institute, Dec. 2018, 207 Pages, Nasa Center for AeroSpace Information, Hanover, Maryland.

European Patent Office, Extended European Search Report regarding European Patent Application No. 21168773.6, dated Oct. 19, 2021, 9 pages.

European Patent Office, Extended European Search Report regarding European Patent Application No. 21168768.6, dated Oct. 19, 2021, 11 pages.

U.S. Patent and Trademark Office, Non-Final Office Action regarding U.S. Appl. No. 16/554,150, dated Oct. 4, 2022, 27 pages.

U.S. Patent and Trademark Office, Non-Final Office Action regarding U.S. Appl. No. 17/553,628, dated Jan. 24, 2023, 47 pages.

European Patent Office, Examination Report regarding European Patent Application No. 21168768.6, dated Mar. 28, 2023, 7 pages.

U.S. Patent and Trademark Office, Non-Final Office Action regarding U.S. Appl. No. 16/877,480, dated Feb. 10, 2023, 49 pages.

U.S. Patent and Trademark Office, Final Office Action regarding U.S. Appl. No. 16/554,150, dated Mar. 27, 2023, 19 pages.

Morrett, Robert, Sep. 10, 2015, "Selecting a filler metal: Seven factors to consider", Plant Engineering. https://www.plantengineering.com/articles/selecting-a-filler-metal-seven-factors-to-consider/ (Year: 2015).

U.S. Patent and Trademark Office, Final Office Action regarding U.S. Appl. No. 16/554,150, dated May 31, 2022, 19 pages.

* cited by examiner

ADDITIVELY MANUFACTURED SATELLITE

BACKGROUND

Space presents a uniquely hostile environment for spacecraft such as satellites. Thermal management in particular is challenging, in addition to the dangers of damaging radiation, orbital debris impact, and extreme loading of launch. Many spacecraft are constructed of multiple composite material parts such as sandwich-structure panels, which are fastened together. Such construction can be strong and light. However, such composite parts have high thermal impedance, and are expensive and labor intensive, both to manufacture and to assemble. For payload specific features such as equipment mounts, custom spacecraft are slow and expensive to design and produce.

Additive Manufacturing (AM) is quickly gaining popularity in many industries as a method of rapid production at relatively low cost. AM, sometimes known as three-dimensional (3D) printing, can be used to create a solid object from a 3D model by building the object incrementally. AM typically applies a raw material that is then selectively joined or fused to create the desired object. The raw material is typically applied in layers, where the thickness of the individual layers can depend upon the particular techniques used.

Often the raw material is in the form of granules or powder, applied as a layer and then selectively fused by a heat source. In many cases, the upper surface of a bed of such material is fused, and the growing workpiece is then lowered slightly into the bed itself. A fresh layer of raw material is then applied to the bed, and the next layer is fused onto the previous one. The granular raw material may include for example thermoplastic polymer, metal powder, metal alloy powder, or ceramic powder, which may be fused using a computer-controlled heat source, such as a scanning laser or scanning electron beam.

Exemplary methods include selective laser melting (SLM), direct metal laser sintering (DMLS), selective laser sintering (SLS), fused deposition modelling (FDM), and electron beam melting (EBM), among others.

Conventional part designs used for subtractive manufacturing or composite laminate construction may be inefficient or even unworkable for AM. Depending on the process and material used, unsupported features may collapse, delicate features may be rendered with insufficient clarity, and/or warping and cracking may occur. New spacecraft designs are needed to compensate for limitations and functional differences of AM while taking advantage of the production speed, cost reduction benefits, and design freedoms.

SUMMARY

The present disclosure provides systems, apparatuses, and methods relating to additively manufactured spacecraft such as satellites. In some examples, a satellite may include a body and a communication device attached to the body. The body may have an additively manufactured external wall structure at least partially forming an enclosed compartment, and the communication device may be configured to receive and transmit data while in space.

In some examples, a satellite may include a housing having an additively manufactured external wall structure, a communication device connected to the housing, and a separation device connected to the wall structure. The communication device may be configured to receive and transmit data while in space, and the separation device may be configured to mount and carry the housing inside a launch vehicle during a launch phase and subsequently release the housing from the launch vehicle after the launch phase.

In some examples, a method of manufacturing a satellite may include printing a wall panel configured to form part of an external wall structure of a satellite, and assembling the external wall structure of the satellite including the wall panel. The method may further include mounting a communication device to the external wall structure, the communication device being configured to receive and transmit data while in space.

Features, functions, and advantages may be achieved independently in various examples of the present disclosure, or may be combined in yet other examples, further details of which can be seen with reference to the following description and drawings.

DETAILED DESCRIPTION

Figure 1:
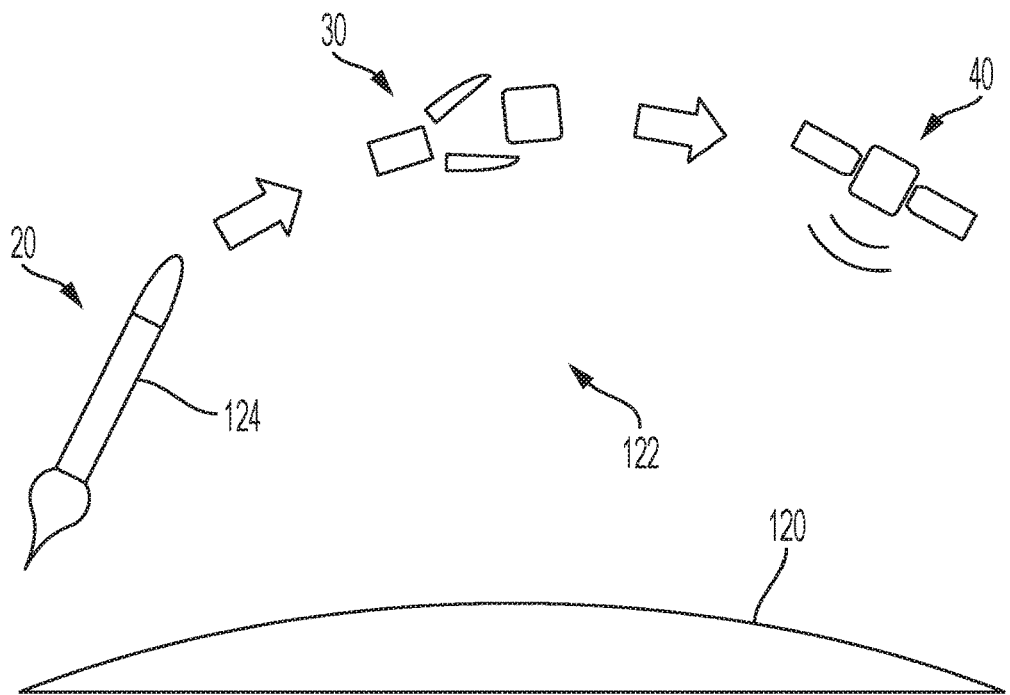
FIG. 1 is schematic diagram of an illustrative satellite in accordance with aspects of the present disclosure.

Various aspects and examples of additively manufactured spacecraft such as satellites, as well as related apparatus and methods, are described below and illustrated in the associated drawings. Unless otherwise specified, a spacecraft in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

In general, a spacecraft in accordance with the present teachings may include an additively manufactured primary structure. The primary structure may also be referred to as a body, a main body, a housing, a wall structure, and/or a frame. The primary structure may be described as those components of the spacecraft designed to transmit loads through the spacecraft to the interface of a launch vehicle and/or deployment system, and to provide attachment points for payloads and associated equipment or components. The primary structure may also be described as main load bearing elements which provide the most direct and efficient load path from spacecraft components to the launch vehicle interface. Examples of a spacecraft may include, but are not limited to an artificial satellite, space station, crewed spacecraft, and/or interstellar probe.

Additive manufacture of the primary structure of the spacecraft may allow design flexibility for the spacecraft, as well as reducing production cycle time, touch labor, cost, and post-production testing. In some examples, the primary structure may include a plurality of additively manufactured panels. The panels may conform to a standard design according to a desired functionality and/or may include customized features. For example, one or more panels may be configured for passive thermal management and heat rejection. For another example, one or more panels may be configured for radiation shielding, one or more panels may be configured for structural load support, and/or one or more panels may be configured for support of payload equipment.

The primary structure may be configured for additive manufacture with limited or no sacrificial material, which may be referred to as secondary supports. More specifically, features of each panel may be configured for printing without secondary supports, to minimize or eliminate wasted material and labor to remove the supports. Each panel may be additively manufactured, or printed, as a single unitary structure. The panel may also be described as monolithic. Structures and/or features separate from the primary structure or added to the primary structure after manufacture in traditionally manufactured spacecraft may be integrated into the printed panels. For example, fastener holes, radiation spot shielding, localized reinforcement or stiffening, access points, and/or equipment mounts may be printed as part of the monolithic panel structure.

The panels of the primary structure may be designed for concurrent printing in a selected additive manufacturing apparatus, or printer. In some examples, secondary structures and/or equipment of the satellite may also be additively manufactured. For example, a propellant tank, thruster brackets, and/or a communications antenna may be additively manufactured.

EXAMPLES, COMPONENTS, AND ALTERNATIVES

The following sections describe selected aspects of exemplary additively manufactured spacecraft as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Satellite and Associated Method

Figure 2:
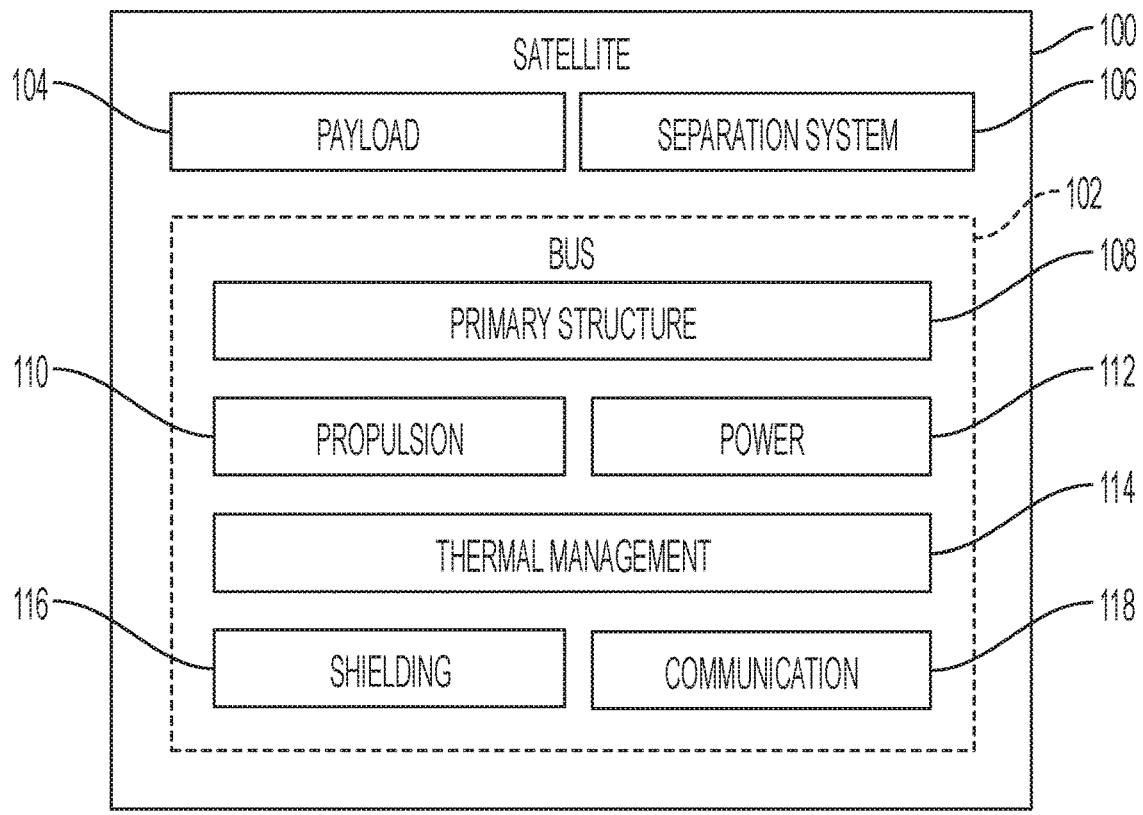
FIG. 2 is a block diagram of the satellite of FIG. 1.

Examples disclosed herein may be described in the context of an illustrative satellite launch method (see FIG. 1) and an illustrative satellite 100 (see FIGS. 1 and 2). Satellite 100 is an example of a spacecraft, as described above. In the present example, the method includes three phases: a launch phase 20, a separation phase 30, and a deployment phase 40. Launch phase 20 may include transporting satellite 100 from a planetary body 120 such as Earth to outer space 122, which may also be referred to as space, using a launch vehicle 124. In some examples, launch vehicle 124 may be a rocket powered vehicle. In the context of Earth, outer space may be a region beyond the Karman line. Separation phase 30 may include separating satellite 100 from launch vehicle 124, once a desired location, trajectory and/or orbit has been achieved. Deployment phase 40 may include preparation of satellite 100 for operation, such as establishing communication with a controller on planetary body 120, extending solar panels or instrument arms, and/or maneuvering to a desired orientation relative to the planetary body. In some examples, the method may further include design, production, and/or in-service phases.

Each of the processes of the launch method may be performed or carried out by a system integrator, a third party, and/or an operator (e.g., a customer). For the purposes of this description, a system integrator may include, without limitation, any number of aerospace manufacturers and major-system subcontractors; a third party may include, without limitation, any number of vendors, subcontractors, and suppliers; and an operator may be an telecommunications company, leasing company, military entity, service organization, and so on. Apparatuses and methods shown or described herein may be employed during any one or more of the stages of the satellite launch method.

As shown in FIG. 2, satellite 100 may include a bus 102 with a plurality of satellite systems, a payload 104 and a separation system 106 or separation device. Examples of the plurality of systems include one or more of a primary structure 108 (e.g. a body), a propulsion system 110, an electrical power system 112, a thermal management system 114, a radiation shielding system 116, and a communication system 118 or communication device. Each system may comprise various subsystems, such as controllers, processors, actuators, effectors, motors, generators, etc., depending on the functionality involved. Any number of other systems may be included. Although an unmanned artificial satellite example is shown, the principles disclosed herein may be applied to other aerospace vehicles and technology, such as a launch vehicle, space station, crewed spacecraft, and/or interstellar probe.

B. Illustrative Additively Manufactured Satellite

As shown in FIGS. 3-12, this section describes an illustrative additively manufactured satellite 200. Satellite 200 is an example of an additively manufactured spacecraft, as described above. As most clearly shown in FIG. 3, satellite 200 is generally cuboidal in shape, and may be described as a cubesat and/or a micro-satellite. The satellite includes a main body 210 which forms the primary structure of the satellite as described above, and is an example of a primary structure 108 as described in Example A. Main body 210 may also be described as a housing.

Main Body 210 is made up of a plurality of additively manufactured wall panels 212 fastened together. Wall panels 212 may be described as an external wall structure of the satellite. In the depicted example, main body 210 is between approximately 10-30 inches (250-800 millimeters) in width. In some examples, the main body may be between approximately 16-20 inches (400-500 millimeters) in width.

In the present example, satellite 200 is designed to closely replicate specifications of an existing satellite design. Such replication may allow existing methods for launch and flight control, payload configurations, etc. to be used with satellite 200, thereby facilitating quick implementation and/or replacement of traditionally manufactured satellites. In some examples, satellite 200 may be designed independently of traditionally manufactured satellite geometry or specifications, for use with updated and/or new methods, payloads, etc.

Figure 3:
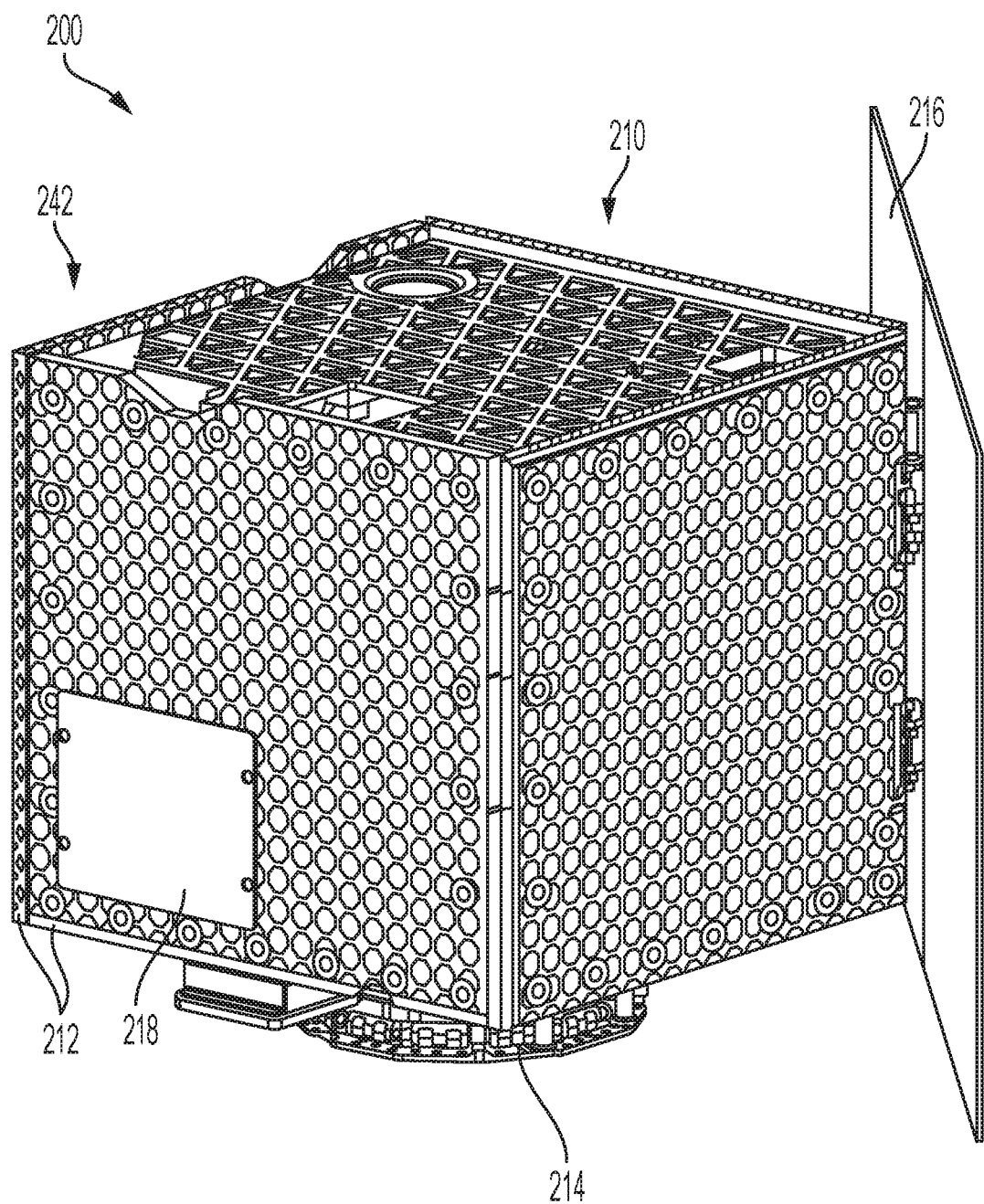
FIG. 3 is an isometric view of an illustrative additively manufactured satellite.

As shown in FIG. 3, a separation system 214, solar panels 216, and a plate antenna 218 are mounted to main body 210. Separation system 214 is an example of separation system 106 as described in Example A, and may also be described as a launch vehicle interface ring. The separation system is configured to act as a sole connection between satellite 200 and a rocket powered vehicle during launch, then facilitate disconnection of the satellite from the vehicle. In the depicted example, separation system 214 is a band-style separation system such as a clamp band or Motorized Light Band (MLB). In some examples, the satellite may employ other separation systems such as a dispenser-style Quadpack or Canisterized Satellite Dispenser (CSD).

Solar panels 216 are configured to supply satellite 200 with electrical power and are integrated with an electrical system of the satellite, such as power system 112 as described in Example A. The electrical system may further include one or more batteries, controllers, transformers, switches, printed circuit boards, wiring, etc. according to the desired functionality. The electrical system may supply power to one or more satellite systems and/or payload equipment.

Plate antenna 218 is configured to send and receive data while in space, in cooperation with a communication system of the satellite. The communication system is an example of communication system 118 as described in Example A. The communication system may include one or more processors, encoders, modulators, transmitters, receivers, data storage devices, additional antennas, etc. according to the desired functionality. In some examples, the communication system of satellite 200 may include an additively manufactured antenna in addition to or instead of plate antenna 218. For example, the communication system may include an antenna as disclosed in U.S. Patent Publication No. 2019/0291186 A1, which is hereby incorporated by reference in its entirety.

Figure 4:
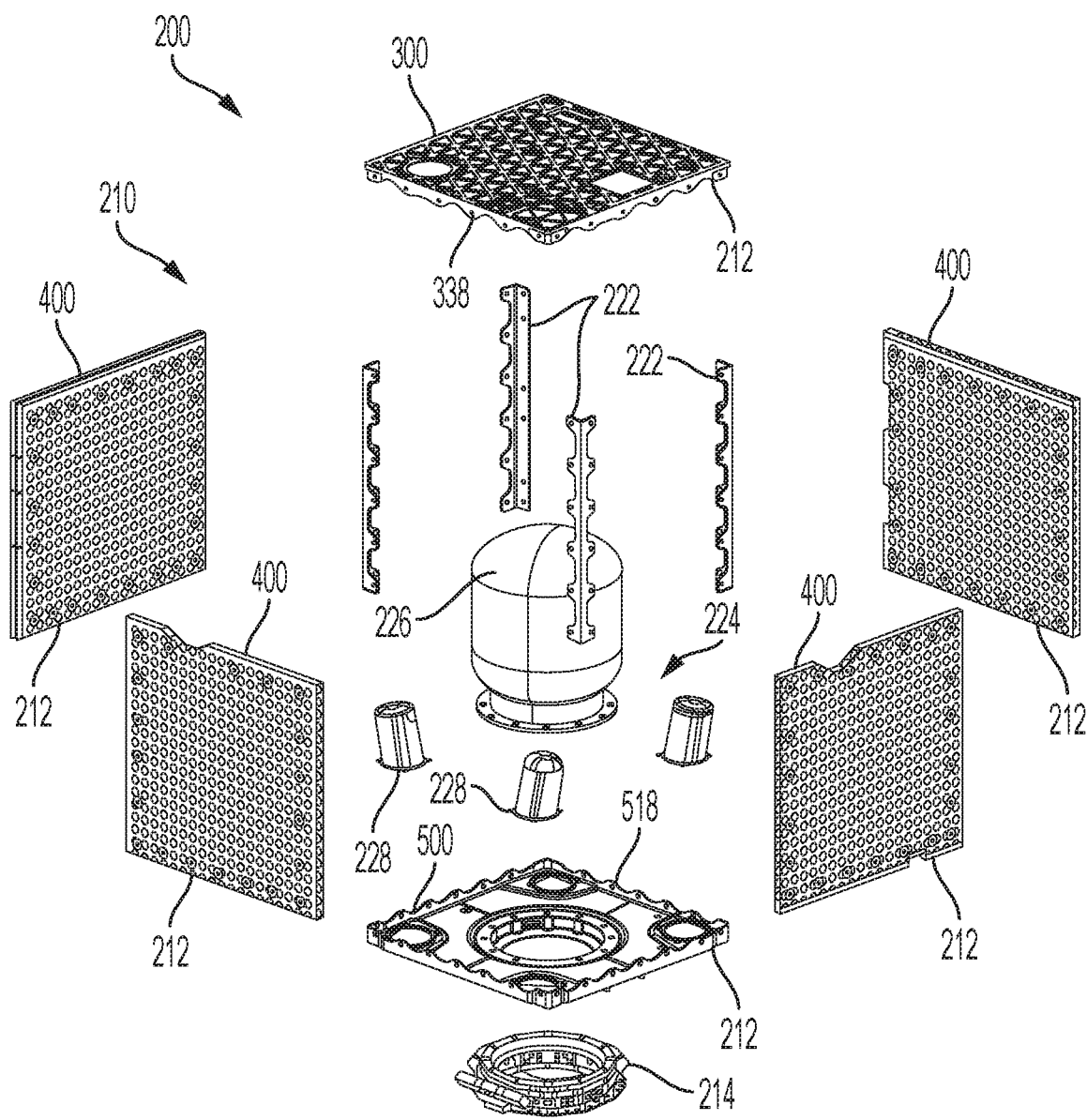
FIG. 4 is an exploded isometric view of the satellite of FIG. 3.

FIG. 4 is an exploded view of satellite 200. As shown, wall panels 212 of main body 210 include an equipment panel 300, four radiator panels 400, and a base panel 500. The equipment panel may also be described as a top panel, or a fore-panel, and the base panel may also be described as a bottom panel, or an aft-panel. In the present example, wall panels 212 are shaped for a cuboidal satellite. In other words, each panel is approximately square in shape. In some examples, the panels may have other shapes appropriate to other satellite designs. For example, a panel may have a triangular, pentagonal, or irregular shape.

Wall panels 212 are assembled into main body 210, forming an enclosed internal compartment 220. Satellite and payload equipment may be housed in the enclosed compartment, mounted to and protected by wall panels 212. Each wall panel is configured to function as a structural component of the main body, and the wall panels are assembled such that loading on main body 210 is effectively transferred between panels. In the present example, wall panels 212 are fastened together, directly and through four corner posts 222.

Radiator panels 400 are indirectly fastened together through corner posts 222. The radiator panels are directly fastened to each of equipment panel 300 and base panel 500. As discussed further below, with reference to FIGS. 5 and 9, the equipment panel and base panel each include side walls configured to overlap the radiator panels. Fasteners extending through aligned apertures in the side walls and the radiator panels secure the panels together.

Corner posts 222 are elongate members, each extending from a corner of base panel 500 to a corresponding corner of equipment panel 300. The posts may also be described as brackets or clips, and have a right-angle or L-shaped cross-section. The posts are similar in shape to an angle iron, and each have two legs. In the depicted example, the corner posts are additively manufactured.

Each leg includes a plurality of apertures arranged in a line, configured to align with a plurality of corresponding apertures in one of radiator panels 400, such that fasteners extending through the aligned apertures secure the panel to the corner post. Each corner post 222 overlaps a pair of radiator panels 400, which meet at the corresponding corner. Each corner post is disposed interior of the radiator panels, and exterior of base panel 500 and equipment panel 300.

To reduce unnecessary weight and material, most of the legs of corner posts 222 are scalloped or recessed according to the locations of the apertures. Where additional structural strength or load tolerance is needed, the corner posts may have solid and/or reinforced legs. In the present example, solar panels 216 are mounted at a corner of main body 210, where two of radiator panels 400 meet, proximate one of corner posts 222. The solar panels may be fastened to the corner post and to the radiator panels. For improved support, the corner post includes a solid, un-recessed leg.

In some examples, all of wall panels 212 may be directly fastened together. However, use of one or more structural components such as corner posts 222 may facilitate removal of one or more wall panels 212 during assembly of satellite 200, for instance to allow for installation of payload equipment in enclosed internal compartment 220. Such structural components may be additively manufactured, in order that all of main body 210 can be rapidly and flexibly designed and produced.

As shown in FIG. 4, satellite 200 further includes a propulsion system 224. In the depicted example, the propulsion system includes a propellant tank 226 and four thrusters mounted in brackets 228. The propulsion system may further include regulators, valves, feed systems, etc. according to the desired functionality. Propellant tank 226 is configured to store a chemical propellant such as hydrazine. Both the tank and brackets 228 are additively manufactured and comprised of a laser sintered titanium alloy. In some examples, satellite 200 may be configured for alternative propulsion technologies such as electrosprays, Hall-effect thrusters, or ion engines.

Propellant tank 226 and the stored propellant may represent a significant fraction of the weight of satellite 200 at launch. The tank may therefore generate significant vertical loading during launch. Accordingly, propellant tank 226 is mounted to base panel 500 opposite, and in axial alignment with, separation system 214. The base panel is configured to efficiently transfer loading from the tank to the separation system and launch vehicle as discussed further below, with reference to FIG. 11.

In the depicted example, wall panels 212 each comprise a laser-sintered aluminum alloy and are printed using direct metal laser sintering (DMLS). Such a metal alloy may offer an advantageous strength-to-weight ratio. In general, the panels may include any material with properties such as strength, stiffness, and weight that are appropriate for a satellite, and may be manufactured by any effective additive manufacturing method. For example, a wall panel may be produced from a polymer with fused deposition modeling (FDM) or may be produced from a titanium alloy with electron beam melting (EBM).

Each of wall panels 212 is monolithic. That is, each panel is printed as a single unit. Each panel may be printed in a series of layers perpendicular to a build axis. The build axis may be defined by the orientation of the panel relative to a printer or other additive manufacturing equipment during printing.

Some or all of wall panels 212 may be configured for concurrent printing. More specifically, a selected subset panels may be designed for printing with a build axis and/or a footprint which allows the subset of panels to be printed in a single deposition. In the present example, all four of radiator panels 400 are printable in a single deposition or print cycle. In some examples, all components of main body 210 may be designed for printing on one printer, in a selected number of sequential depositions. For example, radiator panels 400 may be printed in a first deposition, equipment panel 300 and corner posts 222 may be printed in a second deposition, and base panel 500 may be printed in a third deposition on the same printer.

Each wall panel 212 may include one or more customized structural features 242. The customized features may vary according to the mounting, connection, shielding and/or view factor requirements of payload and/or operational equipment of the satellite, as well as launch method, weight constraints, or any other relevant considerations. The additive manufacture of wall panels 212 may facilitate these customized features, allowing a standardized design to be quickly and cheaply modified for each satellite produced.

Equipment panel 300 is configured to support and shield equipment (not depicted), during launch and operation. The equipment may include payload equipment such as sensors, optics, and data processors, and/or may include satellite equipment such as the electrical and communication systems. The equipment panel may function as a structural support for the equipment, with the equipment fastened or otherwise mounted to the panel. The equipment panel may also shield the satellite equipment from space radiation such as solar wind and cosmic rays. The panel may be configured to block radiation according to an intended orbit of the satellite and/or a radiation tolerance of shielded equipment. That is, the panel may block sufficient radiation to reduce radiation levels inside the satellite to a safe level for the mounted equipment. For example, in low earth orbit for non-radiation hardened electronics, the panel may block at least between 0.5 and 1 megarads of radiation per year. For another example, in geosynchronous orbit for radiation hardened electronics, the panel may block at least approximately 500 megarads per year.

Radiator panels 400 are configured to function as passive thermal management for satellite 200. The monolithic metallic sandwich structure of the panels may allow heat to be conducted from equipment mounted in internal compartment 220 to outer surfaces of the panels and radiated into space. In some examples, the radiator panels may be configured to radiate heat at a rate of at least 5 watts per square foot, between 20 and 40 watts per square foot, and/or at least 50 watts per square foot. The rate of heat radiation or heat dissipation may be tuned and/or tailored according to heat generation properties of equipment mounted in the satellite. The radiator panels may also be configured to act as radiation shielding, and/or as micrometeoroid and orbital debris (MMOD) shielding. In some examples, the radiator panels may be integrated into a thermal management system of the satellite, including passive and/or active thermal management such as heat pipes, cold plates, and/or thermoelectric coolers.

Base panel 500 is configured to support vertical loads from equipment panel 300 and radiator panels 400, as well as equipment mounted to the panels. The base panel is configured for connection to separation system 214, and to transfer loads from main body 210 through the separation system to a launch vehicle. Base panel 500 is also configured to support propulsion system 224, including propellant tank 226 and thruster brackets 228.

Each of wall panels 212 is configured and positioned according to equipment and systems of satellite 200. That is, design and location of each panel may be selected according to properties or requirements of the specific equipment mounted to and/or adjacent the panel, structural or orientation requirements of satellite systems such as propulsion and communication, and/or expected conditions during launch and operation. For instance, In the depicted example, equipment panel 300 is located at the top side of satellite 200, opposite separation system 214, to align the panel with a launch axis. For another example, equipment panel 300 may be located on a side of satellite 200 expected to face toward the sun in order to shield radiation-sensitive equipment from solar wind.

Figure 5:
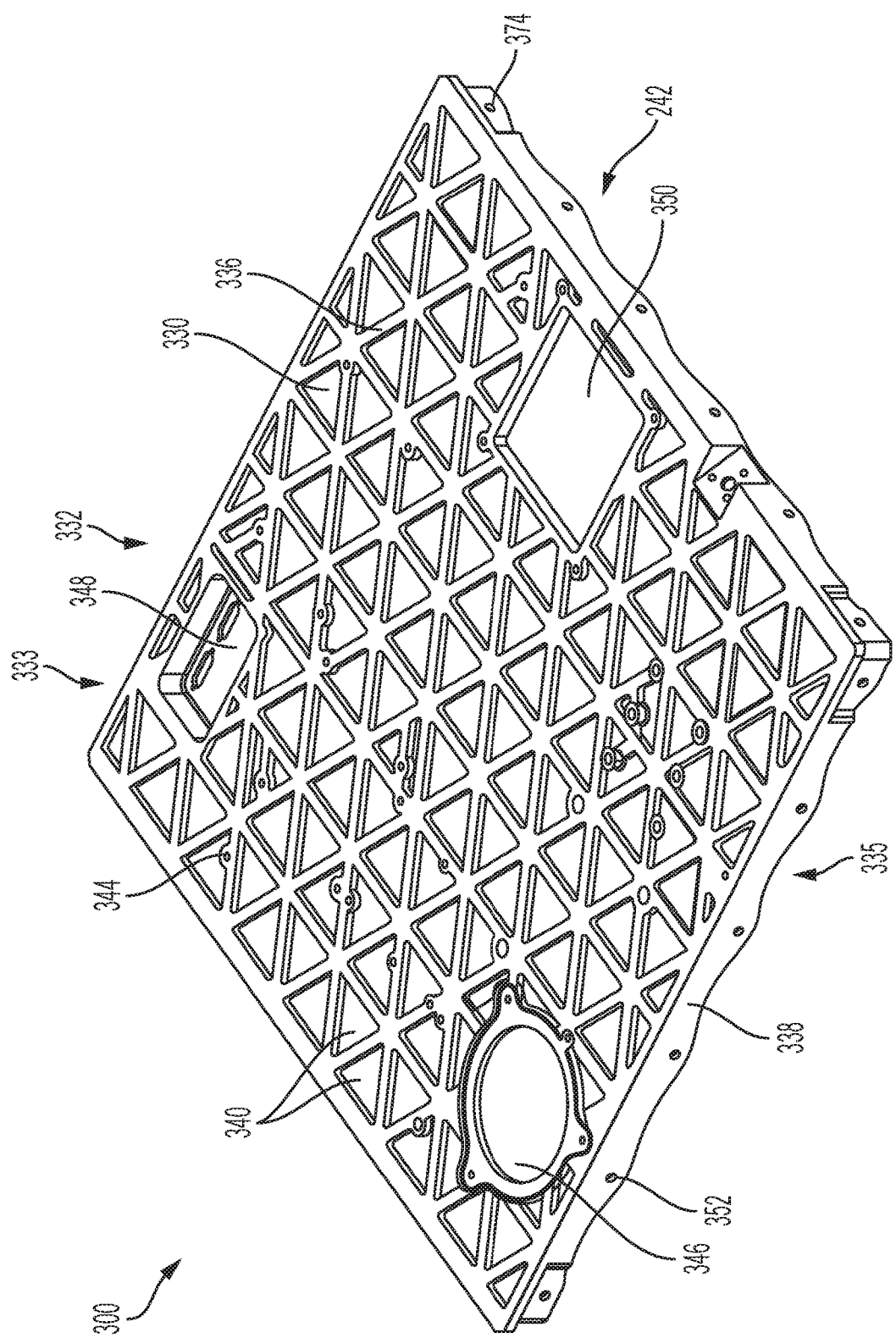
FIG. 5 is an isometric top view of the equipment panel of the satellite of FIG. 3.

FIG. 5 is an isometric view of an exterior side of equipment panel 300. The panel includes a facesheet 330, which is generally square and planar and may also be described as a plate. Facesheet 330 has a first side 333, a second side 335, and four linear outer edges. Extending from first side 333 of the facesheet, on exterior side 332 of the panel, is a stiffening structure 336.

In the present example, a majority of stiffening structure 336 forms a grid of equilateral triangles 340. The stiffening structure may also be described as forming an array of equilateral triangles. Together, facesheet 330 and stiffening structure 336 may be described as an isogrid or an isogrid panel. In general, stiffening structure 336 may form any pattern appropriate to a desired stiffness of equipment panel 300. For example, the stiffening structure may form a rectangular grid and/or may form a grid of varying density to allow location-variant stiffness. Some patterns of stiffening structure 336 may be preferable, as more efficient for additive manufacture, as described further below with reference to FIG. 6.

The un-depicted interior side of facesheet 330 may be flat, apart from customized structural features 242. Locating the stiffening structure on the exterior side of the facesheet may facilitate mounting of equipment to the interior side and increase available space inside the satellite.

In the depicted example, customized structural features 242 of equipment panel 300 include a plurality of threaded fastener apertures 344, a fluid exchange connection 346, an external mount recess 348, and a star tracker view window 350. Other potential customized structural features not included in the present example include electrical connections, solar panel and/or antenna mounts, and a pattern of apertures matching a communications array. Customized structural features 242 may be built into facesheet 330 and/or stiffening structure 336. For instance, fluid exchange connection 346 includes an aperture through facesheet 330 and a modification to stiffener 336 to define a recess to receive a seal.

Extending from the outer edges of facesheet 330 are four side walls 338, which include a plurality of fastener holes 352. In the present example, the side walls extend toward an interior of the satellite when equipment panel 300 is assembled into the main body of the satellite. Side walls 338 are configured to facilitate connection of equipment panel 300 to the other panels of the main body of the satellite. Referring briefly back to FIG. 4, each side wall overlaps one of radiator panels 400, contacting an inner side of the panel such that fastener holes 352 are aligned with corresponding holes printed in the radiator panel. Fastener assemblies extending through the aligned holes secure the two panels together.

At the corners of equipment panel 300, where two of side walls 338 meet, each of the two side walls deviates slight from planar to form a corner recess 374, which may be seen more clearly in FIG. 5. Each corner recess 374 is configured to receive an end of one of corner posts 222. As discussed above in reference to FIG. 4, the corner posts are received between side walls 338 and radiator panels 400. Corner recesses 374 allow side walls 338 to also contact the radiator panels directly, and without gaps.

Similar to corner posts 222, side walls 338 have a scalloped edge to allow a desired location of fastener holes 352 relative to facesheet 330, while minimizing material and weight of equipment panel 300. In some examples, equipment panel 300 may include other connection features in addition to or instead of side walls 338. For instance, the satellite may include four horizontally oriented corner posts in place of side walls 338.

Figure 6:
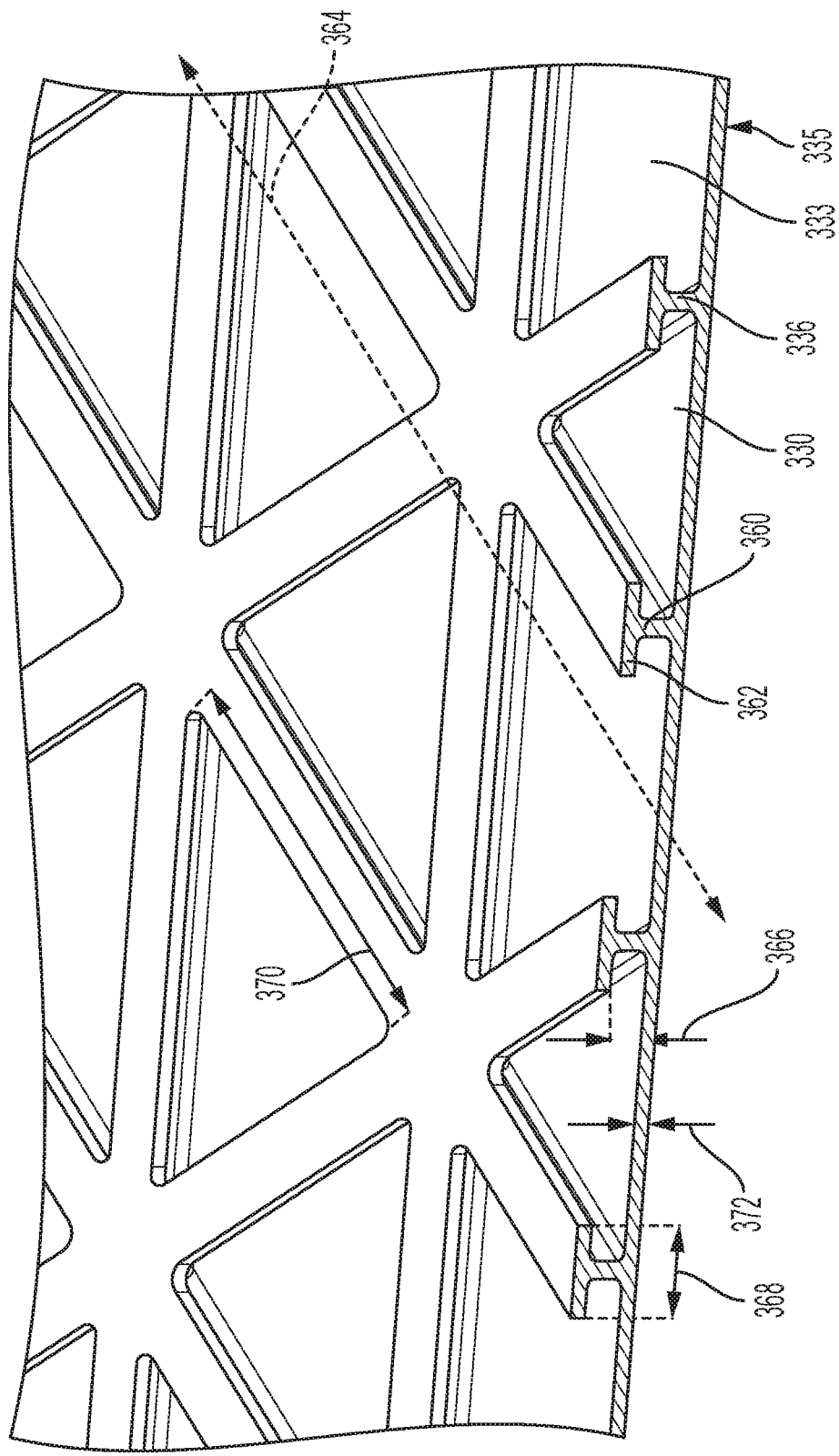
FIG. 6 is a close-up cut-away view of the equipment panel of FIG. 5.

FIG. 6 is a partial cut-away view of equipment panel 300, showing stiffening structure 336 in more detail. Stiffening structure 336 may be described as an isogrid flange stiffener and/or as a T-beam. In combination with facesheet 330, the stiffening structure may be described as forming I-beams and/or may be described as a flanged isogrid panel. The stiffening structure includes a web portion or web 360 and a flange portion or cap 362.

Web 360 extends from exterior side 332 of facesheet 330, perpendicular to the facesheet. Cap 362 is centered on web 360, spaced from facesheet 330 by the web, and extends parallel to the facesheet. The cap may also be described as extending in two opposing directions from a distal end of web 360. Web 360 and cap 362 are each generally planar and/or plate-like, and extend linearly to form grid of triangles 340. At intersection points of the grid, the web and cap may be described as forming a node having a round and/or hexagonal shape.

In some examples, stiffening structure 336 may have alternative geometries. For instance, the stiffening structure may include only web 360 or cap 362 may extend in only one direction from the distal end of the web. The depicted I-beam geometry of the stiffening structure may be preferable, as providing stiffness with minimal additional weight.

Stiffening structure 336 may be configured for printing without use of secondary supports. Both linear portions and nodes of the web and cap may be configured for printing without use of sacrificial or secondary supports. More specifically, all surfaces of stiffening structure 336 may be oriented relative to a build axis 364 of equipment panel 300 such that the stiffening structure is printable without secondary supports. For instance, web 360, cap 362, and the overall pattern of the stiffening structure may form angles of no more than 45 degrees relative to build axis 364. Grid of equilateral triangles 340 may facilitate this orientation, where other patterns such as squares may not have an orientation conforming to this angle requirement.

Dimensions of stiffening structure 336 may be tuned to achieve desired stiffness of equipment panel 300. Web 360 has a depth 366 and cap 362 has a width 368. In the present example, web depth 366 is between approximately 0.1 and 0.3 inches and cap width 368 is between approximately 0.25 and 0.75 inches. Each triangle of grid of equilateral triangles 340 has a side length 370. In the present example, side length 370 is between approximately one and five inches.

Varying cap width 368 may alter the moment of inertia of the stiffening structure and thereby alter the stiffness of the equipment panel. Varying triangle side length 370 may alter the density of stiffening structure 336 on facesheet 330, thereby altering the stiffness of the equipment panel.

Thicknesses of equipment panel 300 may also be tuned to achieve desired panel properties. Facesheet 330 has a thickness 372. In the present example, web 360 and cap 362 each have the same thickness as facesheet 330, which is between approximately 0.05 and 0.125 inches. This range may provide sufficient radiation shielding for typical satellite equipment without adding unnecessary weight. An appropriate thickness may depend at least in part on the material of facesheet 330. In some examples, the web and cap may have different thicknesses.

In the present example, each of dimensions depth 366, width 368, length 370, and thickness 372 is constant throughout equipment panel 300. In some examples, one or more of the dimensions may vary across the panel, to achieve localized or targeted variation in the properties of the panel. For example, a region of the panel may have decreased length 370 and increased width 368 to provide additional stiffness needed to support a particularly massive piece of equipment mounted proximate the region. For another example, a region of the panel may have increased thickness 372 to provide additional shielding for particularly radiation sensitive equipment.

Figure 7:
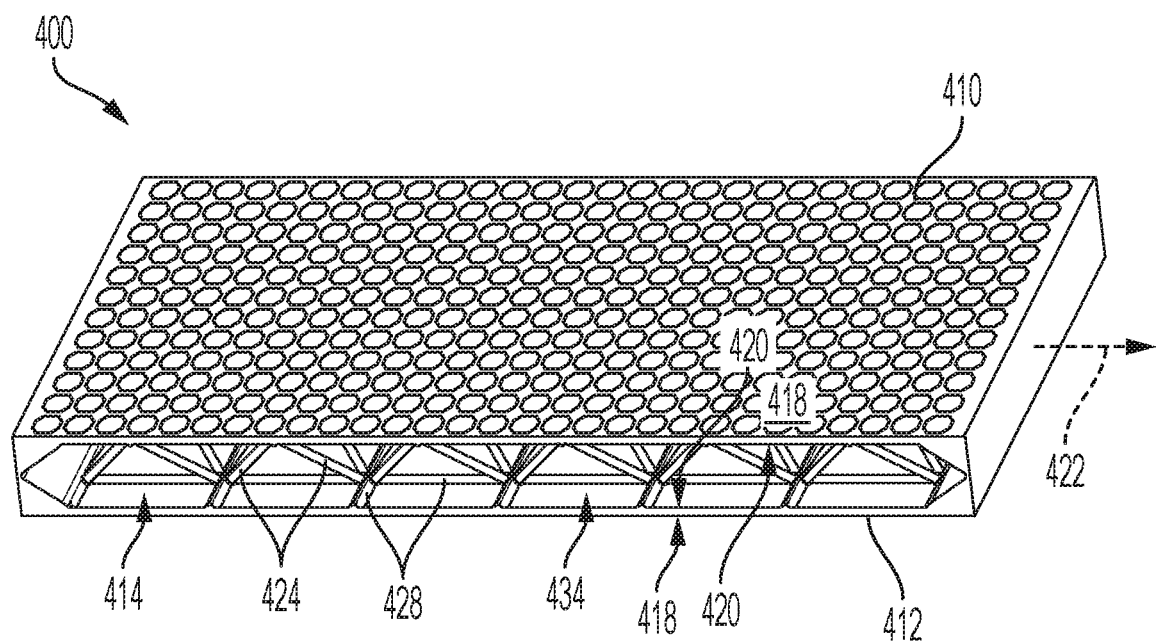
FIG. 7 is an isometric cut-away view of a radiator panel of the satellite of FIG. 3.
Figure 8:
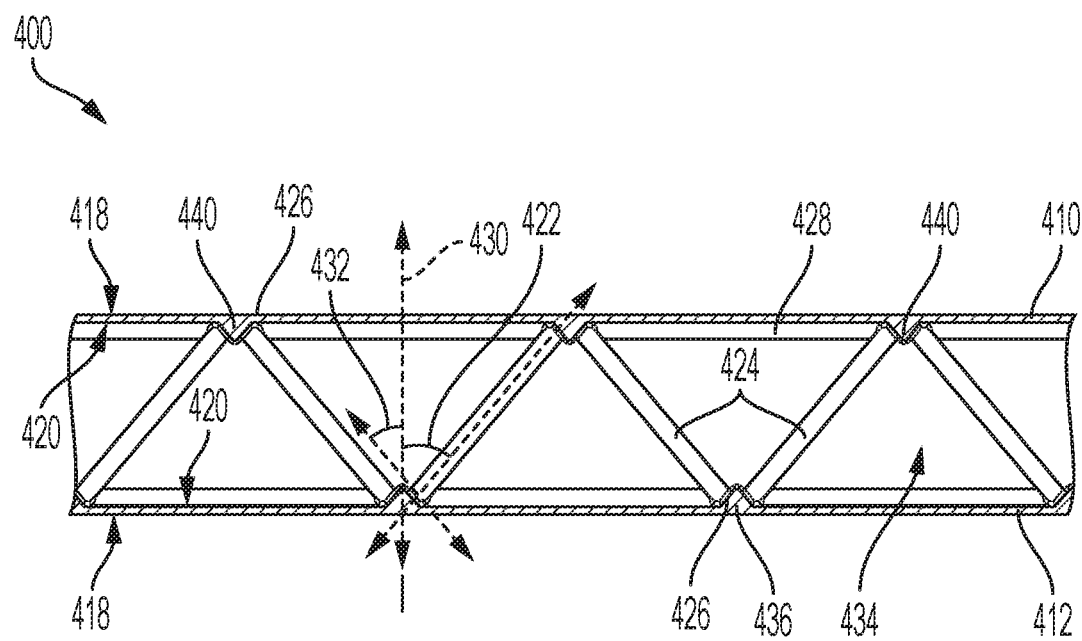
FIG. 8 is a cross-sectional view of the radiator panel of FIG. 7, along lines 7-7.

FIGS. 7 and 8 are cutaway views of one of radiator panels 400. The following description may be understood to apply to any of the four radiator panels. Radiator panel 400 is an example of an additively manufactured truss panel and includes a first skin 410 and a second skin 412 connected by a truss structure 414. The radiator panel may be described as a monolithic sandwich structure. As described further below, each of the skins and the truss structure may be shaped, featured, and/or configured according to desired properties of radiator panel 400.

Manufacture of skins 410, 412 and truss 414 as a unitary metal structure may improve thermal performance and heat rejection of the panel by removing impedance caused by adhesive materials used in traditionally manufactured sandwich panels. In particular, an aluminum alloy may provide effective heat radiation and/or rejection. Such thermal properties may be especially advantageous for thermal management in a space environment.

In the present example, radiator panel 400 is approximately half an inch thick. Each of skins 410, 412 is planar and has an outer surface 418 and an inner surface 420. First skin 410 is parallel to second skin 412. In the present example, each skin has a uniform thickness throughout, and has the same thickness of approximately 0.02 inches. In some examples, one or both skins may vary in thickness and/or one skin may have a greater thickness than the other.

Outer surface 418 of each of skins 410, 412 includes a stiffening texture 419. The texture is a regular, repeating pattern over the outer surfaces except where interrupted by custom features of the radiator panel. Custom features may include, for example, recesses for solar panel mounting brackets, fastener apertures corresponding to the corner posts or other panels, a window for the plate antenna, among others. In the present example, stiffening texture 419 is a square grid of linear portions, including circular portions at each intersection of the linear portions. The texture is raised from outer surface 418 but does not overhang the surface. Therefore, the texture may improve stiffness of skins 410, 412 without reducing radiative efficiency or creating light traps on radiator panel 400.

Truss structure 414 includes a plurality of truss members 424 extending between nodes 426. As shown in FIG. 8, each truss member extends between a node on inner surface 420 of first skin 410 and a node on the inner surface of second skin 412. Each truss member 424 is approximately cylindrical in shape.

Truss structure 414 includes an array of core structures. Each core structure may include a framework of truss members 424, arranged according to any appropriate geometry. The geometry of the core structures may be uniform over radiator panel 400 or may vary according to location in the panel. For example, the core structures may vary according to expected non-uniform loading of radiator panel 400. The core structures may be arranged in a grid, a repeating pattern, and/or in any effective manner.

In some examples, the core structures may be a box framework. Such a framework may include four pairs of crisscrossed cylindrical truss members, each truss member extending diagonally between skins 410, 412. In the depicted example, the core structures are pyramid frameworks 434, which are arranged in a grid. Each core pyramid 434 includes four truss members 424.

As shown in FIG. 8, each truss member 424 extends from a separate base node 438 to a single common upper node 440. Base nodes 438 are disposed at the corners of a square, and each core pyramid 434 may be described as having a base at the first skin and a vertex at the second skin. Alternatively, truss members 424 of truss structure 414 may be viewed as belonging to an array of core pyramids each having a base at the second skin and a vertex at the first skin. Radiator panel 400 may accordingly have a symmetrical response to loading.

In the present example, truss structure 414 further includes a plurality of triangular stiffeners 428 on inner surfaces 420 of first skin 410 and second skin 412. In the present example, each stiffener has a maximum thickness of approximately 0.04 inches, or twice the thickness of skins 410, 412. The maximum thickness of stiffeners 428 is also approximately equal to a diameter of truss members 424.

Each node 426 is located at a stiffener, and radiator panel 400 includes a tessellated pattern of core pyramids 434 and off-set grid patterns of stiffeners 428. First skin 410 is covered by the array of core pyramids without gaps or overlaps, with the base of each core pyramid meeting the bases of adjacent core pyramids along stiffeners 428 of first skin 410.

Stiffeners 428 may improve structural properties of skins 410, 412 such as stiffness and buckling stability, and may strengthen connection between truss members 424 and the skins. Including the stiffeners may allow the thickness of the skins to be reduced without sacrificing desired structural properties.

Radiator panel 400 has a primary axis 422, which extends parallel to skins 410, 412 and a secondary axis 430 which is perpendicular to the primary axis and to the skins. In the present example, primary axis 422 is also the build axis of radiator panel 400. In other words, the panel is printed such that primary axis 422 is aligned with a build direction of an additive manufacturing apparatus. Because primary axis 422 is parallel to skins 410, 412, the skins may be described as being printed vertically. Each of outer surface 418 and inner surface 420 of first skin 410 and second skin 412 may extend in the build direction throughout printing.

Such orientation may allow the skins to be printed without secondary supports, with a good surface finish, and with limited warping. Such orientation may also reduce a footprint size of radiator panel 400 and allow multiple panels to be printed concurrently, in a single deposition run.

Stiffeners 428 and core pyramids 434 are configured to be self-supporting during printing of radiator panel 400. More specifically, the triangular cross-sectional shape of the stiffeners is shaped and oriented to allow self-support, and truss members 424 of the core pyramid each extend at angles selected to allow self-support. As shown in FIG. 8, each side of the triangular cross-sectional shape of stiffeners 428 extends at a stiffener angle 432 relative to secondary axis 430. Angle 432 may be at least 35 degrees. In the depicted example, angle 432 is approximately 40 degrees.

A first truss angle 442 between a truss member 424 and secondary axis 430 is also shown in FIG. 8. First truss angle 442 lies in the plane defined by the primary and secondary axes of radiator panel 400. A second truss angle, not shown, is also defined between truss member 424 and secondary axis 430 in the plane perpendicular to the primary axis but including the secondary axis. Each truss angle may be at least 35 degrees and no more than 50 degrees. An angle of 35 degrees or more may allow the truss member to be printed without secondary supports. On the other hand, an angle of no more than 50 degrees may ensure that the truss formed by the truss members is sufficiently strong. In the present example, core pyramid 434 has a square base, and as a result the first and second truss angles are equal. In the present example, the truss angles are each 40 degrees.

Each core pyramid 434 may also be configured according to desired structural properties of radiator panel 400. For example, the first and/or second truss angle may be increased or decreased to tune the panel to a desired stiffness. For another example, a diameter of each truss member 424 may be increased to improve panel strength or decreased to reduce overall panel weight.

Figure 9:
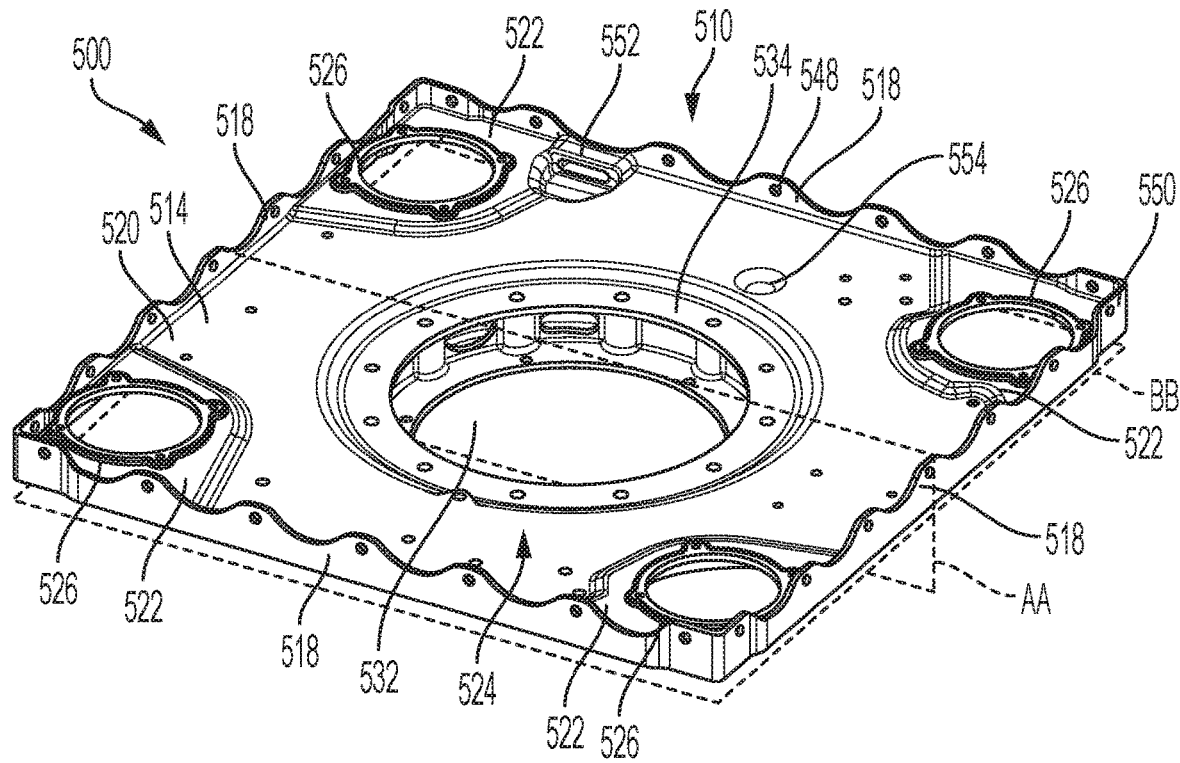
FIG. 9 is an isometric top view of the base panel of the satellite of FIG. 3
Figure 10:
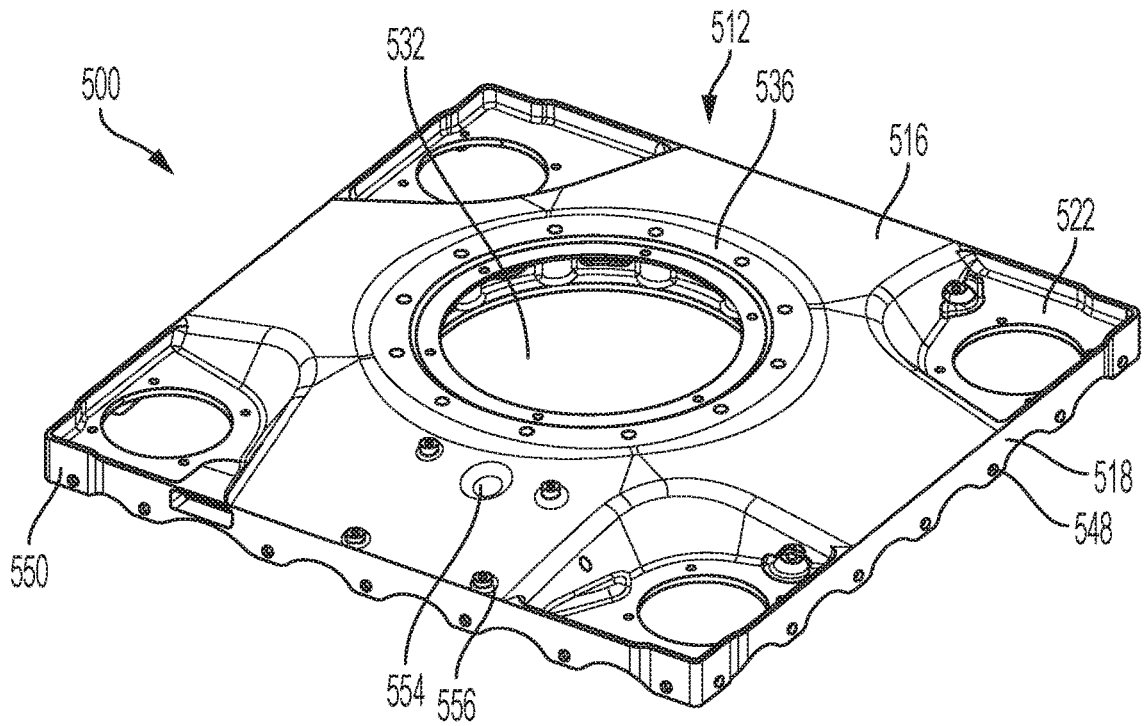
FIG. 10 is an isometric bottom view of the base panel of FIG. 9

FIGS. 9 and 10 show an interior side 510 and an exterior side 512 of base panel 500, respectively. When the base panel is assembled into the satellite, interior side 510 faces the enclosed interior compartment of the satellite and exterior side 512 faces the exterior environment.

Base panel 500 includes an inner skin 514, an outer skin 516, and four side walls 518. The inner skin and side walls define the square shape of the base panel, while the outer skin has a generally contoured cross shape or x-shape. Inner skin 514 has a similarly cross shaped main portion 520 and four raised corner portions 522. Inner skin 514 and outer skin 516 meet and are joined at a perimeter of the outer skin and of main portion 520 of the inner skin. Main portion 520 of inner skin 514 is planar, and outer skin 516 is convex relative to the inner skin.

Base panel 500 further includes a central interface ring 524 and multiple thruster bracket interface rings 526. In the present example, the base panel includes four thruster bracket interface rings, corresponding to the four thrusters of the satellite. Each thruster bracket interface ring 526 is disposed in one of raised corner portions 522. Location of the thruster bracket interface rings and/or shape and contouring of inner skin 514 and outer skin 516 may be determined by the number and type of thrusters and/or thruster brackets used in the satellite. Preferably the rings may be symmetrically arranged in base panel 500.

Each thruster bracket interface ring 526 includes a circular aperture 528 and a surrounding annular mounting surface 530. Aperture 528 may also be described as an opening or hole through base panel 500. Aperture 528 extends through raised corner portion 522 of inner skin 514. Mounting surface 530 is shaped and reinforced to conform to and support an outer edge of a thruster bracket, when mounted to base panel 500 over aperture 528. A plurality of fastener apertures also extend through raised corner portion 522 of inner skin 514 proximate mounting surface 530, to facilitate mounting of the thruster bracket.

Central interface ring 524 includes a larger circular aperture 532, an inner annular surface 534, and a stepped outer annular surface 536. Inner annular surface 534 comprises the interior side of an annular portion 535 of inner skin 514, and outer annular surface 536 comprises the exterior side of an annular portion 537 of outer skin 516. The central interface ring is configured for connection of propellant tank 226 and separation system 214 (see FIG. 4). The propellant tank is mounted to annular inner surface 534, and the separation system is mounted to stepped annular outer surface 536. Each annular surface may be sized and/or shaped according to specifications of the corresponding mounted structure. For example, the width of inner annular surface 534 in the panel design may be modified to match a connector flange of a new propellant tank prior to printing of base panel 500.

Figure 11:
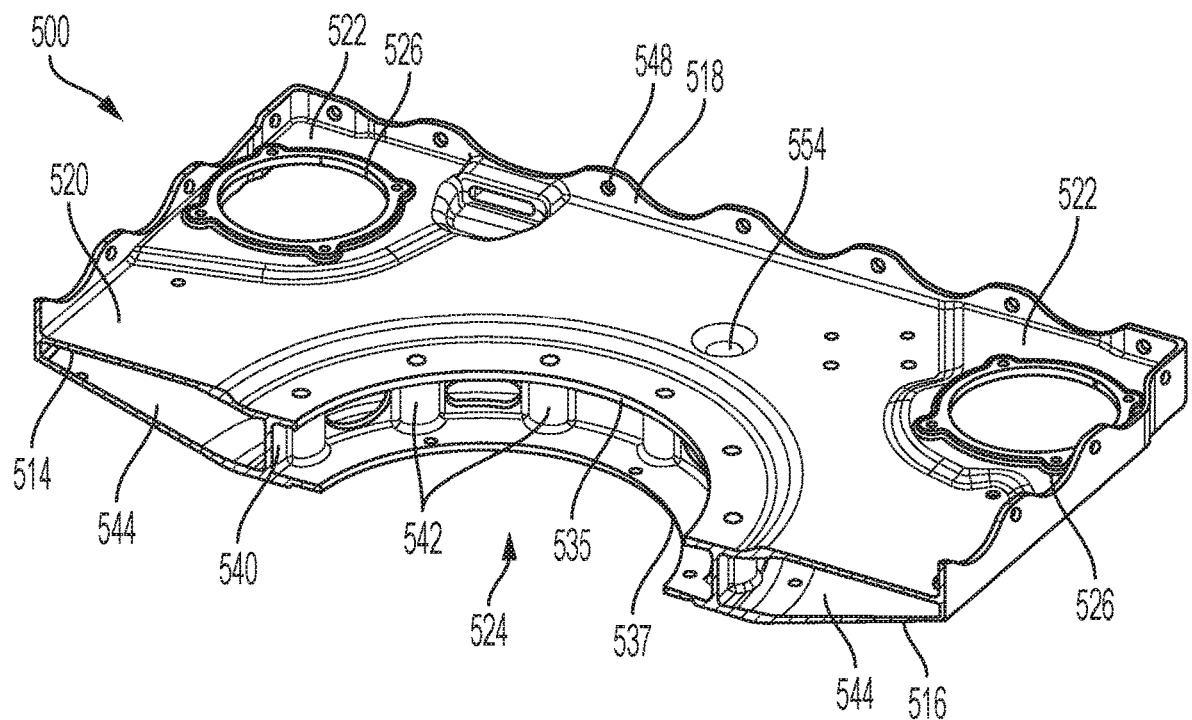
FIG. 11 is a cut-away view of the base panel of FIG. 9, cut along plane AA.

Base panel 500 is hollow, as shown in FIG. 11, which is a cross section of base panel 500 along plane AA. Main portion 520 of inner skin 514 is spaced from outer skin 516 except where the two skins are joined at the outer perimeter. At central interface ring 524, the inner and outer skins are joined by a vertical ring wall 540. Together, annular portion 535 of inner skin 514, annular portion 537 of outer skin 516, and ring wall 540 form an I-beam structure. This structure may strengthen base panel 500 and facilitate efficient transfer of loads between the propellant tank mounted to inner annular surface 534 and the separation system mounted to outer annular surface 536.

Ring wall 540 also includes a plurality of fastener columns 542, equally spaced circumferentially around central interface ring 524. Each column is centered on ring wall 540, extending from inner skin 514 to outer skin 516, and includes a fastener aperture. Each aperture extends from inner annular surface 534 through the respective fastener column to outer annular surface 536. The fastener columns may facilitate secure mounting of the propellant tank and separation system, as well as reinforcing ring wall 540 and improving load transfer.

Figure 12:
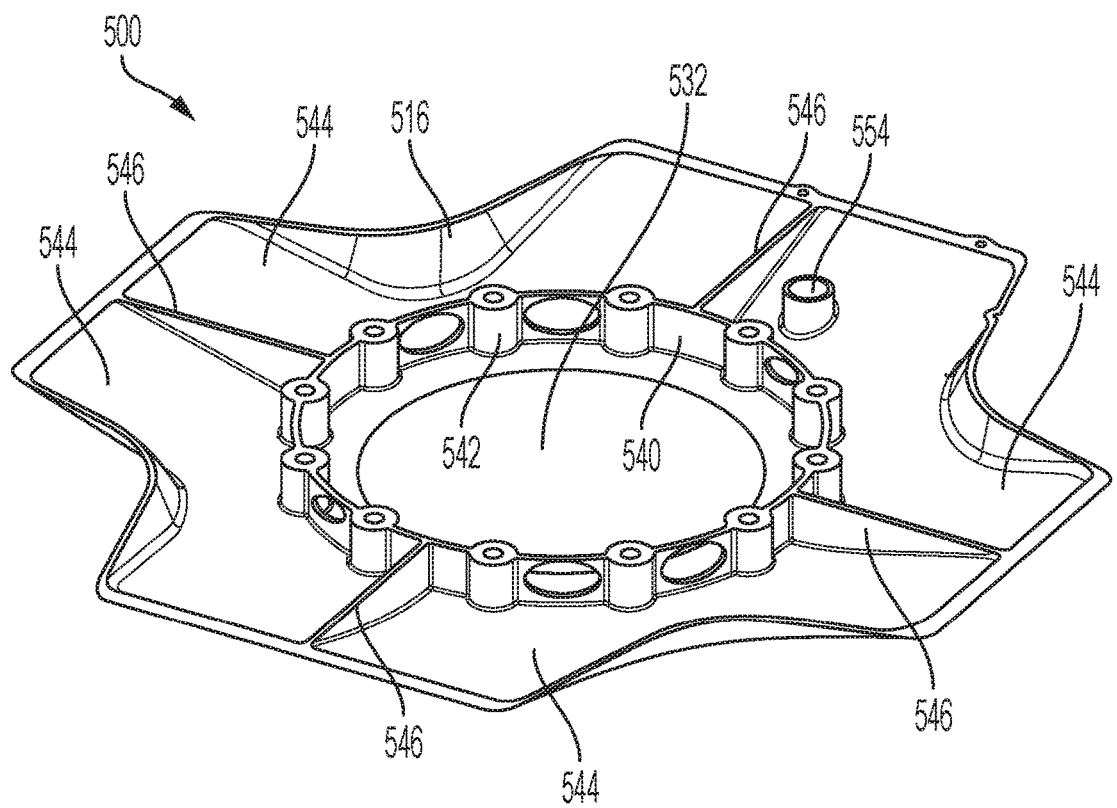
FIG. 12 is another cut-away view of the base panel of FIG. 9, cut along plane BB.

The hollow interior of base panel 500 is divided into separate interior cavities 544 by a plurality of stiffener ribs 546, as can be seen in FIG. 12, another cross section of the base panel along plane BB. In the present example, base panel 500 includes four interior cavities 544 and four stiffener ribs 546. Each stiffener rib is planar, extending vertically between outer skin 516 and inner skin 514 and horizontally between ring wall 540 and the outer perimeter of the outer skin. Stiffener ribs 546 may be described as each centered relative to an arm of the cross-shaped outer skin, and extending parallel to the respective arm.

Stiffener ribs 546 may carry shear loads through base panel 500 and increase the panel stiffness. Interior cavities 544 and the depth of base panel 500 may improve the resistance of the base panel to bending loads. The hollow design of base panel 500 may save weight, material cost, and print time, while maintaining desired panel stiffness and strength. The shape and location of stiffener ribs 546 and/or interior cavities 544 may be determined according to the shape of outer skin 516, the number and type of thrusters mounted to the base panel, mass of the propellant tank and stored propellant, expected bending loads, and/or any relevant structural considerations. Any number and/or pattern of ribs may be used.

In the present example, inner skin 514, outer skin 516, side walls 518, and stiffener ribs 546 have approximately the same thickness. Each structure is approximately 0.08 inches thick. In some examples, the thickness of these structures may differ and/or the thickness of any one structure may vary. Preferably, inner skin 514 and outer skin 516 may be at least approximately 0.05 inches thick and no more than approximately 0.125 inches thick. Annular portions 535, 537 and ring wall 540 are reinforced relative to the inner and outer skins, and may be between approximately 1.5 and 2 times the thickness of the inner and/or outer skin. Interior cavities 544 taper in depth, with a maximum depth between approximately 0.5 and 2 inches.

Referring again to FIGS. 9 and 10, side walls 518 include a plurality of fastener holes 548. In the present example, the side walls extend toward an interior of the satellite when base panel 500 is assembled into the main body of the satellite. Side walls 518 are configured to facilitate connection of base panel 500 to the other panels of the main body of the satellite. Referring briefly back to FIG. 4, each side wall overlaps one of radiator panels 400, contacting an inner side of the panel such that fastener holes 548 are aligned with corresponding holes printed in the radiator panel. Fastener assemblies extending through the aligned holes secure the two panels together.

At the corners of base panel 500, where two of side walls 518 meet, each of the two side walls deviates slight from planar to form a corner recess 550. Each corner recess 550 is configured to receive an end of one of corner posts 222. As discussed above in reference to FIG. 4, and similarly to equipment panel 300, the corner posts are received between side walls 518 and radiator panels 400. Corner recesses 550 allow side walls 518 to also contact the radiator panels directly, and without gaps.

Similar to corner posts 222, side walls 518 have a scalloped edge to allow a desired location of fastener holes 548 relative to inner skin 514, while minimizing material and weight of base panel 500. In some examples, base panel 500 may include other connection features in addition to or instead of side walls 518. For instance, the satellite may include four horizontally oriented corner posts in place of side walls 518.

As noted above, base panel 500 may further include one or more customized structure features 242. In the depicted example, customized structural features 242 of base panel 500 include an electrical connector 552, shown in FIG. 9, an access port 554 extending through the panel, shown in FIGS. 9-12, and mounting points 556 for equipment connecting through the access port, shown in FIG. 10.

C. Illustrative Method of Additive Manufacture

Figure 13:
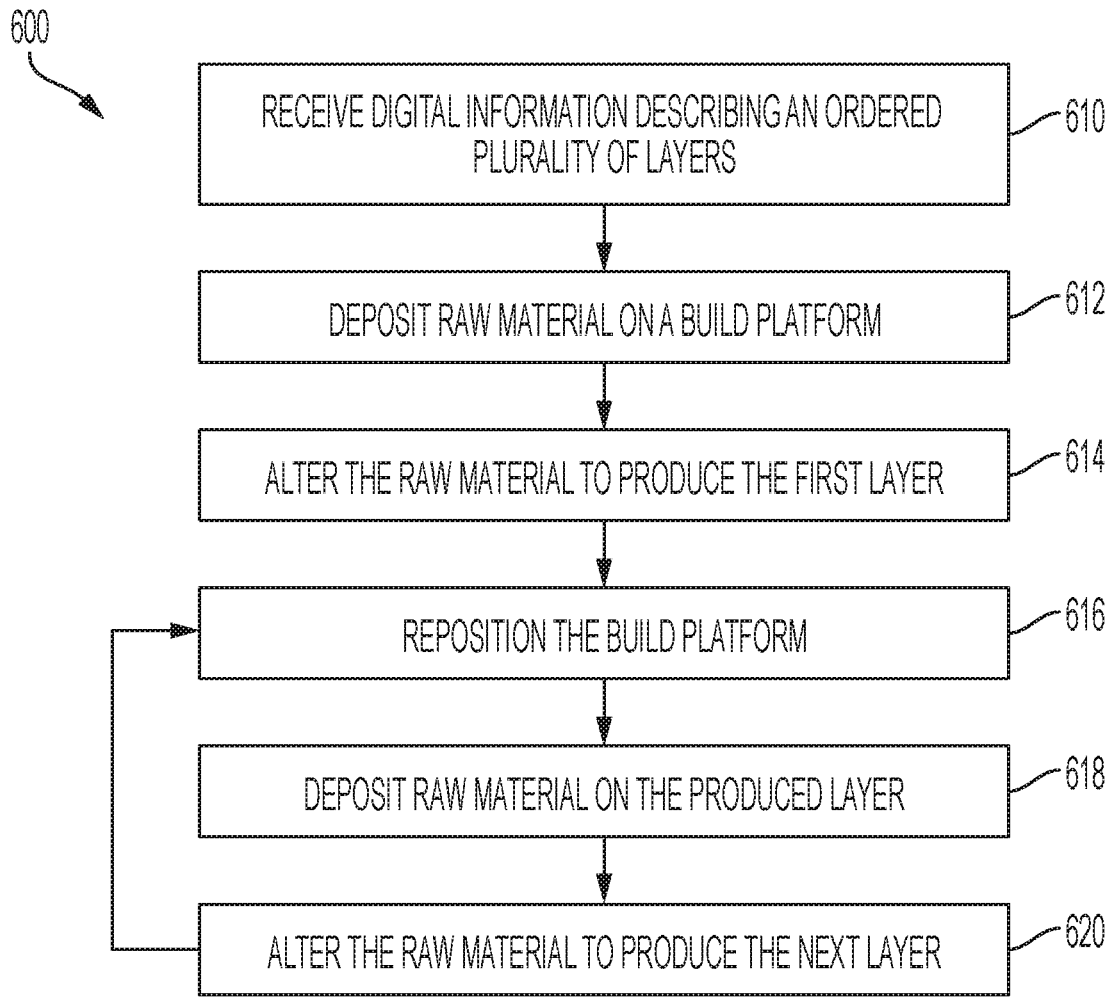
FIG. 13 is a flow chart depicting steps of an illustrative method of additive manufacture.

This section describes steps of an illustrative method 600 for additive manufacture of a workpiece; see FIG. 13. Aspects of an illustrative additive manufacturing device depicted in FIG. 14 may be utilized in the method steps described below. Where appropriate, reference may be made to components and systems that may be used in carrying out each step. These references are for illustration, and are not intended to limit the possible ways of carrying out any particular step of the method.

In some examples, method 600 may also be referred to as a method of 3-D printing. The terms additive manufacture and 3D printing may both be understood to include processes in which an object is created by adding material in successive layers. Additive manufacture may be understood as a broader term, encompassing 3D printing. In some examples, interchangeable usage of the terms additive manufacture and 3D printing may be appropriate. In the present disclosure, printing and/or a printing step may be understood to include creation by any method of additive manufacture. Examples of additive manufacturing processes include, but are not limited to, material extrusion, powder bed fusion, material jetting, binder jetting, directed energy deposition, vat photopolymerization, and sheet lamination.

FIG. 13 is a flowchart illustrating steps performed in an illustrative method, and may not recite the complete process or all steps of the method. Although various steps of method 600 are described below and depicted in FIG. 13, the steps need not necessarily all be performed, and in some cases may be performed simultaneously or in a different order than the order shown.

Figure 14:
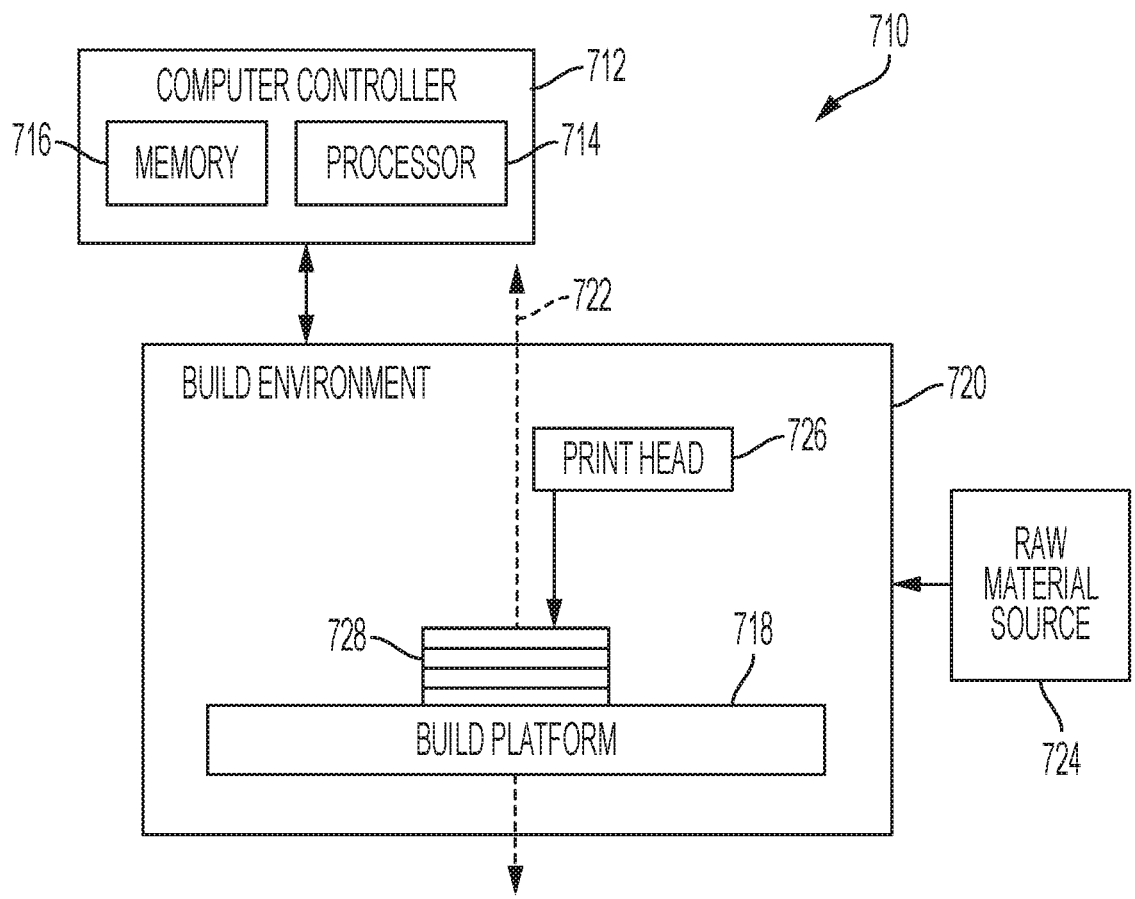
FIG. 14 is a schematic diagram of an illustrative additive manufacturing apparatus.

At step 610, digital information describing an ordered plurality of layers is received. The digital information may be received by a computer controller 712 of an additive manufacturing device 710 as depicted in FIG. 14. The additive manufacturing device may also be referred to as a printer, or a fabricator. Computer controller 712 may comprise any data processing system configured to receive digital design information and control functions of printer 710. The illustrative computer controller shown in FIG. 14 includes a processor 714 for controlling printer functions and memory 716 for storing received data.

The received information may include geometric data and/or design details for a plurality of two-dimensional patterns that constitute layers of a three-dimensional object, where the three-dimensional object is a workpiece 728 to be manufactured. The layers may also be described as cross-sections or slices. The plurality of layers is ordered, such that the layers may be numbered or organized from a first layer to a last layer.

Step 612 of method 600 includes depositing raw material on a build platform 718 located in a building environment 720 of printer 710. The build platform may comprise a support moveable by computer controller 712 along a manufacturing axis 722. The build platform may have a planar surface perpendicular to manufacturing axis 722.

The raw material may be any material appropriate to additive manufacturing, typically a fluid or powder and including but not limited to photopolymer resin, thermoplastic, plaster, ceramic, and metal. The material may be distributed from a raw material source 724 such as a hopper, a tank, or a powder bed. For example, aluminum powder may be swept from a powder bed over build platform 718 by a brush arm actuated by computer controller 712.

The raw material may be distributed evenly over build platform 718, or may be deposited in a selected pattern. Depositing may be done under control of computer controller 712. In some examples, build platform 718 may be submerged in raw material and depositing may be accomplished by gravity or fluid pressure. In some examples, a print head 726 connected to raw material source 724 may deposit the raw material in a pattern corresponding to the first layer of the ordered plurality of layers.

At step 614, the raw material is altered to produce the first layer. In other words, a physical change is induced the deposited material, according to the design information describing the first layer of the ordered plurality of layers and as directed by the computer controller 712, to realize the first layer as a physical object on the build platform.

The material may be acted on by a print head 726 of printer 710, controlled by computer controller 712. For example, the print head may include a laser that cures a photopolymer by exposure to light or sinters a metal powder by exposure to heat. The print head may be directed by computer controller 712 to follow a path delineated in the received digital information for the first layer, and/or a path calculated by processor 714 based on the received digital information.

Step 616 includes repositioning the build platform. In some examples, build platform 718 may start a selected distance from print head 726. The selected distance may be determined by the procedures performed by the print head. Subsequent to production of a layer, the build platform may be repositioned by computer controller 712 along manufacturing axis 722 away from print head 726 by the layer's thickness. That is, the build platform may be moved such that a top surface of the produced layer is the selected distance from print head 726.

In some examples, build platform 718 may start in alignment with another element of printer 710 such as a raw material distribution component. Subsequent to production of a layer, the build platform may be repositioned by computer controller 712 along manufacturing axis 722 such that a top surface of the produced layer is aligned with the other element of printer 710. In some examples, at step 616 print head 726 may be repositioned instead of or in addition to build platform 718. In some examples, step 616 may be skipped.

At step 618, raw material is deposited on the layer produced in the preceding step of method 600. As described for step 612, the raw material may be any appropriate material and may be deposited any appropriate manner. At step 620, the raw material is altered to produce the next layer as previously described for step 614.

Steps 616 through 620 may be repeated to produce each layer of the plurality of layers of the received digital information, until the last layer is produced. The produced first through last layers may then comprise workpiece 728 as described in the received digital information. The workpiece may be removed from the printer and post-processed as desired. For example, the workpiece may be machined from a build plate of the build platform, and then fine details or smooth surfaces may be further finished by machining or other methods.

Workpiece 728 manufactured according to method 600 may possess different structural properties as compared to a workpiece manufactured according to traditional manufacturing methods such as machining, molding, and/or assembly. For example, all parts and/or features of workpiece 728 may be integral and/or monolithic. For another example, workpiece 728 may comprise a plurality of fused layers of material, where each layer is perpendicular to a build axis of the workpiece. For another example, workpiece 728 may include microstructural anisotropy resulting from the directionality of the manufacturing process.

D. Illustrative Method of Manufacturing a Satellite

Figure 15:
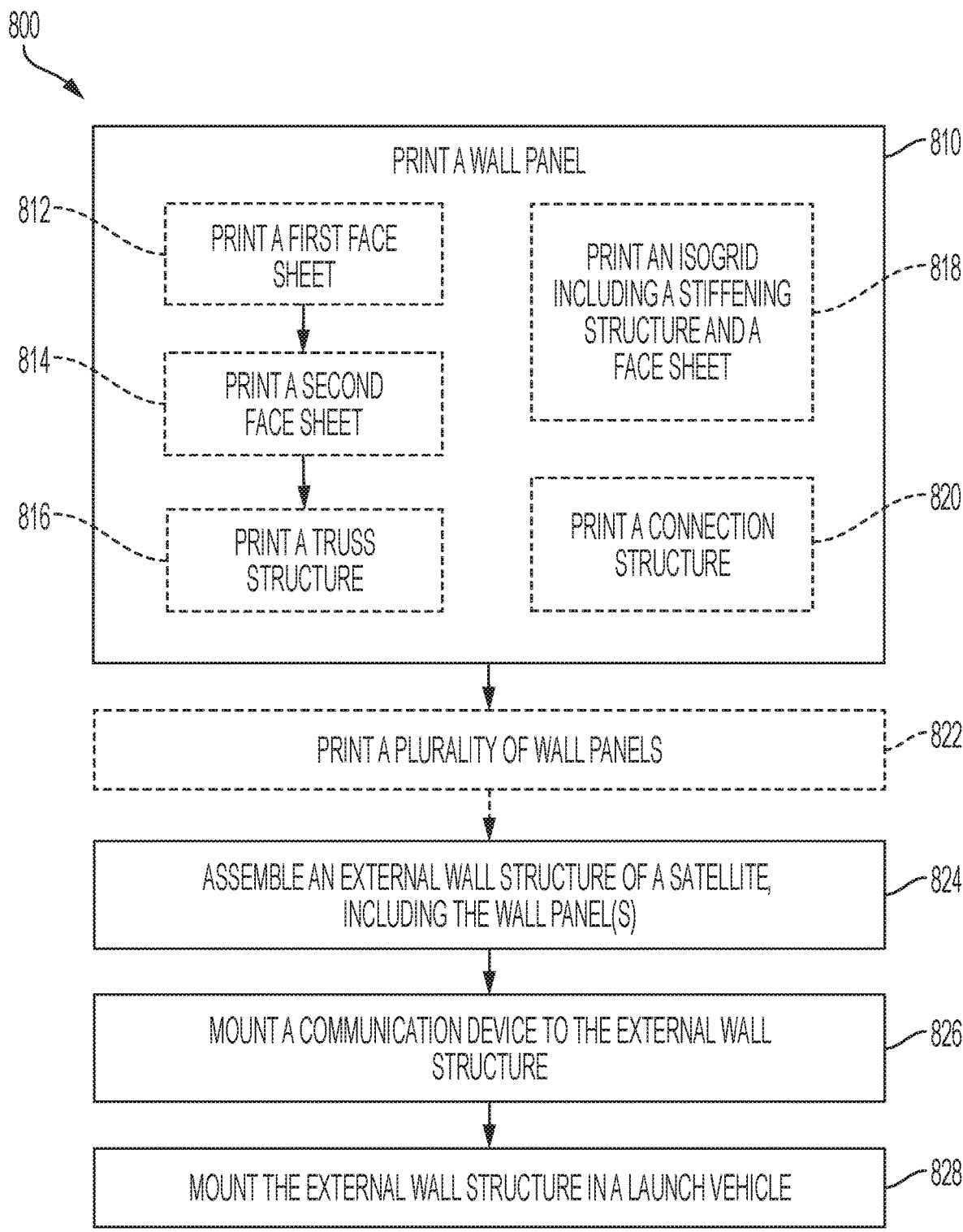
FIG. 15 is a flow chart depicting steps of an illustrative method of additively manufacturing a spacecraft, according to the present teachings.

This section describes steps of an illustrative method 800 for manufacturing a satellite; see FIG. 15. Aspects of satellites, panels, and/or additive manufacturing methods and apparatus described above may be utilized in the method steps described below. Where appropriate, reference may be made to components and systems that may be used in carrying out each step. These references are for illustration, and are not intended to limit the possible ways of carrying out any particular step of the method.

FIG. 15 is a flowchart illustrating steps performed in an illustrative method, and may not recite the complete process or all steps of the method. Although various steps of method 800 are described below and depicted in FIG. 15, the steps need not necessarily all be performed, and in some cases may be performed simultaneously or in a different order than the order shown.

At step 810, the method includes printing a wall panel. In some examples, the wall panel may be square or rectangular, and generally planar. The wall panel may be configured as a main load bearing element, or primary structure. Printing the wall panel may include printing standard structural features according to a standard panel design, such as are described in optional sub-steps 812-820 below. Printing the wall panel may further include printing custom features incorporated into the panel design in order to accommodate specific structural or functional requirements for the panel. For example, step 810 may include printing a star tracker view window, an antenna mount, an o-ring recess, MMOD spot shielding, and/or an electrical connector interface.

Optional sub-steps 812-816 may be performed to print a monolithic sandwich panel. Such a panel may be particularly suited to portions of a satellite that benefit from passive heat rejection and low weight, but minimal radiation shielding. Sub-step 812 includes printing a first facesheet, and sub-step 814 includes printing a second facesheet. The facesheets may also be described as skins and/or walls. The first facesheet may be spaced from the second facesheet and may be parallel to the second facesheet. Each facesheet may have a generally planar extent and a limited thickness. The thickness of the facesheets may be equal, may differ, and/or may vary over the facesheets.

Each facesheet may have an inner side and an outer side, where each of the inner and outer sides extends parallel the build direction during printing. sub-steps 812, 814 may also be described as vertically printing the facesheets, and/or the facesheets may be described as parallel to the build direction during printing.

Sub-step 816 includes printing a truss structure. The truss may be connected to the first facesheet and may be connected to the second facesheet, thereby connecting the first facesheet to the second facesheet. The truss may be described as sandwiched between the first and second facesheets and/or as forming a core of the wall panel.

The truss may include a plurality of elongate and/or cross-shaped members arranged into an array of core structures. Each core structure may include a geometrical framework such as a pyramidal framework or a cuboidal framework. The plurality of elongate members may be arranged such that the members function as a structural truss and transfer loads between the first facesheet and the second facesheet. Each member may be configured and/or oriented such that the truss can be printed without secondary supports. That is, the truss may be printable without need for subsequent removal of sacrificial supporting structures.

The truss may be printed concurrently with the first and second facesheets. That is, sub-steps 812-816 may be performed simultaneously. Each layer of material deposited during printing may include a portion of the first facesheet, a portion of the truss, and a portion of the second facesheet. The first and second facesheets and the truss may be printed as a single monolithic structure. That is, the facesheets and the truss may be printed together to form a panel of printed material without joints or seams.

Optional sub-step 818 may be performed to print an isogrid panel. Such a panel may be particularly suited to portions of a satellite that benefit from greater radiation shielding. Sub-step 818 includes printing an isogrid including a facesheet and a stiffening structure.

The facesheet may include a first side and a second side. In some examples, the first side may comprise an outer or exterior side and the second side may comprise an inner or interior side. The facesheet may be printed at an angle between approximately 30 and 45 degrees with the build direction. The thickness of the facesheet may be selected according to desired radiation shielding or blocking properties of the wall panel.

The stiffening structure may be printed on the first side of the facesheet. The stiffening structure may comprise a regular, repeating grid or lattice extending from the facesheet and/or may include localized shapes and features. At least a portion of the stiffening structure may form a grid of equilateral triangles.

In some examples, printing the stiffening structure may include printing a web portion and a flange portion. The web portion may extend from the facesheet, and the flange portion may extend from a distal end of the web portion. The stiffening structure may be described as a T-beam, or as forming an I-beam with the facesheet. Dimensions of the stiffening structure such as a width of the flange portion may be selected according to desired stiffness of the wall panel.

The stiffening structure may be printed concurrently with the facesheet. Each layer of material deposited during printing may include a portion of the facesheet, and a portion of the stiffening structure. The facesheet and the stiffening structure may be printed as a single monolithic structure. In other words, the facesheet and stiffening structure may be printed together to form a panel of printed material without joints or seams.

Optional sub-step 820 may be performed to print a panel including a connection structure for mounting the satellite to an external structure such as a launch vehicle. Sub-step 820 includes printing a connection structure configured to connect the panel to a separation system. The connection structure may be configured for a selected separation system. For example, when a band-style separation system is selected, the connection structure may include an interface ring with an annular mounting surface. The connection structure may also include features designed to efficiently transfer loads between the satellite and the separation system, such as an I-beam structure. Printing such a panel may further include printing a deep cross section, preferably with a hollow interior. Such a configuration may improve resistance to bending loads, with a minimal increase to panel weight.

Optional step 822 of method 800 includes printing a plurality of wall panels. The step may include repeating step 810 sequentially and/or printing multiple panels concurrently. For example, six panels may be printed in one printer over the course of three depositions. A first panel may be printed according to step 810 and optional sub-step 818, then a second panel may be printed according to step 810 and optional sub-step 820. Four additional panels may be printed in a single deposition, each printed according to step 810 and optional sub-steps 812-816.

Step 824 of the method includes assembling an external wall structure of a satellite, including the wall panel printed in step 810 and any wall panels printed in optional step 822. The wall panels may be assembled to form the primary structure of the satellite, in any effective manner. For example, the wall panels may be directly or indirectly fastened together. For another example, the wall panels may be bonded, welded, or otherwise fixed together. The assembled wall structure may include only the wall panels, may include the wall panels and additional additively manufactured components, and/or may include the wall panels and one or more traditionally manufactured components.

At step 826, the method includes mounting a communication device to the external wall structure. The communication device may include an antenna such as a cup dipole, a command horn, or an array antenna and/or other elements of a communication system such as processors, encoders, modulators, transmitters, or receivers. The communication device may be configured to facilitate communication between the satellite and a planetary body and/or another spacecraft, while in space. In some examples, the communication device may transmit and/or receive data using radio waves, microwaves, and/or any electromagnetic radiation.

The communication device may be mounted to the external wall structure in any effective manner. For example, an antenna may be fastened directly to a wall panel, may be printed as an integrated structure of a wall panel, and/or may be fixed to a deployable mechanism of the satellite. The communication device may be mounted to an exterior of the external wall structure or may be mounted in an internal compartment enclosed by the external wall structure.

Step 828 includes mounting the external wall structure in a launch vehicle. The launch vehicle may include any vehicle or system configured to transport the satellite from a planetary body into space. For example, the launch vehicle may include a rocket configured to propel the satellite from Earth's surface, past the Karman line into space. The satellite may be described as the payload of the launch vehicle.

The external wall structure may be mounted to the launch vehicle with a payload adaptor and/or a separation system. For example, a band-style separation system such as a clamp band, Motorized Light Band (MLB), KSRC, or Mechanical Lock System (MLS), a dispenser-style separation system such as a Quadpack or Canisterized Satellite Dispenser (CSD), and/or a pyrotechnic separation system may be used.

ILLUSTRATIVE COMBINATIONS AND ADDITIONAL EXAMPLES

This section describes additional aspects and features of additively manufactured satellites, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A satellite, comprising:
  a body having an additively manufactured external wall structure at least partially forming an enclosed compartment, and
  a communication device attached to the body, configured to receive and transmit data while in space.

A1. The satellite of A0, wherein the external wall structure includes plural side panels, each side panel being additively manufactured of laser sintered aluminum alloy.

A2. The satellite of A1, wherein each side panel radiates heat from inside the compartment at a rate of at least 5 watts per square foot.

A3. The satellite of A1, wherein each side panel radiates heat from inside the compartment at a rate between approximately 20 and 40 watts per square foot.

A4. The satellite of A1, wherein each side panel radiates heat from inside the compartment at a rate of at least 45 watts per square foot.

A5. The satellite of any of A0-A4, wherein the external wall structure includes plural side panels, each side panel being monolithic.

A6. The satellite of A5, wherein each side panel includes first and second face sheets connected by an internal truss structure.

A7. The satellite of any of A0-A6, further comprising a propulsion system configured to propel the satellite in space.

A8. The satellite of A7, wherein the propulsion system includes an additively manufactured propellant tank.

A9. The satellite of any of A0-A8, wherein the wall structure includes an additively manufactured isogrid panel.

A10. The satellite of A9, wherein the isogrid panel includes a face sheet comprised of laser sintered aluminum alloy, and having a thickness sufficient to block at least 0.5 megarads per year of radiation originating outside the compartment.

A11. The satellite of A10, wherein the thickness is sufficient to block at least 1 megarad per year of radiation.

A12. The satellite of A10 or A11, wherein the thickness is sufficient to block at least 100 megarad per year of radiation.

A13. The satellite of any of A10-A12, wherein the thickness is sufficient to block at least 500 megarad per year of radiation.

A14. The satellite of any of A9-A13, wherein the isogrid panel includes a face sheet and an isogrid stiffening structure on an outer side of the body of the satellite.

A15. The satellite of A14, wherein the isogrid stiffening structure includes I-beam structures forming an array of equilateral triangles.

A16. The satellite of any of A0-A15, wherein the communication device includes an additively manufactured antenna mounted inside the compartment.

A17. The satellite of any of A0-A16, wherein the communication device includes an additively manufactured antenna mounted outside the compartment.

A18. The satellite of any of A0-A17, wherein the entire external wall structure is additively manufactured of laser sintered aluminum alloy.

A19. The satellite of A18, wherein the external wall structure is cuboidal, including four side panels, a fore-panel, and an aft panel.

A20. The satellite of any of A0-A19, wherein the external wall structure includes an additively manufacture aft panel connected to a separation system configured to mount and carry the body inside a launch vehicle during a launch phase, and to release the body from the launch vehicle after the launch phase.

A21. The satellite of A20, wherein the additively manufactured aft panel is hollow.

A22. The satellite of A20 or A21, wherein the aft panel has one or more openings aligned with a thruster bracket of the satellite.

A23. The satellite of A22, wherein the one or more thruster brackets are comprised of laser sintered titanium.

B0. A satellite, comprising:
a housing having an additively manufactured external wall structure,
a communication device connected to the housing, configured to receive and transmit data while in space, and
a separation device connected to the wall structure, configured to mount and carry the housing inside a launch vehicle during a launch phase, and subsequently release the housing from the launch vehicle after the launch phase.

B1. The satellite of B0, wherein the external wall structure includes additively manufactured side panels configured to radiate heat from inside the housing.

B2. The satellite of B1, wherein each side panel comprises a monolithic sandwich structure.

B3. The satellite of any of B0-B2, wherein the external wall structure includes a panel configured to block space radiation from entering the housing.

B4. The satellite of any of B0-B3, wherein the external wall structure includes a panel connected to the separation device.

C0. A spacecraft launch assembly, comprising:
a rocket powered vehicle,
a payload including an additively manufactured wall structure, and
a separation device connecting the wall structure to the rocket powered vehicle, configured to mount and carry the payload inside the rocket powered vehicle during a launch phase, and subsequently release the payload from the rocket powered vehicle after the launch phase.

C1. The spacecraft launch assembly of C0, wherein the payload includes a satellite.

C2. The spacecraft launch assembly of C0 or C1, wherein the satellite includes an additively manufactured antenna.

D0. A method of manufacturing a satellite, comprising:
printing a wall panel configured to form part of an external wall structure of a satellite,
assembling an external wall structure of the satellite including the wall panel,
mounting a communication device to the external wall structure, the communication device being configured to receive and transmit data while in space.

D1. The method of D0, wherein the printing step includes:
printing a plurality of wall panels configured to form the entire external wall structure of a satellite.

D2. The method of D1, wherein the plurality of wall panels are printed concurrently.

D3. The method of D2, wherein the plurality of wall panels are printed on a single printer.

D4. The method of any of D0-D3, wherein the panel is comprised of laser sintered aluminum alloy.

D5. The method of any of D0-D4, wherein the wall panel is a monolithic sandwich structure.

D6. The method of any of D0-D5, wherein the printing step includes:
printing a first face sheet,
printing a second face sheet, and
printing a truss structure connecting the first and second face sheets.

D7. The method of any of D0-D6, wherein the printing step includes:
printing an isogrid including a stiffening structure on a face sheet.

D8. The method of any of D0-D7, wherein the printing step includes:
printing a structure on the wall panel, the structure being configured for connection to a separation device.

D9. The method of claim D, further comprising:
mounting the external wall structure inside a launch vehicle.

E0. A satellite comprising:
an external skin structure including a wall panel comprising laser sintered metal alloy, and a communication device inside the skin structure configured to send and receive data while in space.

E1. The satellite of E0, wherein the wall panel is comprised of laser sintered aluminum alloy.

E2. The satellite of E0 or E1, wherein the wall panel is comprised of laser sintered titanium alloy.

E3. The satellite of any of E0-E2, wherein communication device includes an additively manufactured antenna.

E4. The satellite of any of E0-E3, wherein the external skin structure is comprised entirely of laser sintered metal alloy.

E5. The satellite of any of E0-E4, wherein the wall panel includes a monolithic sandwich structure.

Advantages, Features, and Benefits

The different examples of the additively manufactured satellite described herein provide several advantages over known solutions for manufacturing satellites. For example, illustrative examples described herein allow rapid, on-demand production of satellites.

Additionally, and among other benefits, illustrative examples described herein reduce manufacturing cycle time, including reducing the number of manufacturing steps, the touch labor time, and the post-production testing.

Additionally, and among other benefits, illustrative examples described herein allow design agility and rapid customization of a standard design to a specific payload.

Additionally, and among other benefits, illustrative examples described herein reduce cost and part count by integrating previously separately manufactured components and post-processed features into the additive manufacture of the satellite primary structure.

Additionally, and among other benefits, illustrative examples described herein allow high levels of customization and localized design.

Additionally, and among other benefits, illustrative examples described herein allow concurrent printing of some or all primary structure components in a single deposition.

Additionally, and among other benefits, illustrative examples described herein allow printing without sacrificial secondary supports.

No known system or device can perform these functions, particularly for a highly-precise, strong, and lightweight satellite primary structure. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A satellite, comprising:
  a body having an additively manufactured external wall structure at least partially forming an enclosed compartment, and
  a communication device attached to the body, configured to receive and transmit data while in space,
  wherein the external wall structure includes:
    plural side panels, each side panel being monolithic,
    a monolithic fore-panel having a stiffened panel portion and side walls that extend from outer edges of the stiffened panel portion, wherein:
      the stiffened panel portion and the side walls each have an outer face,
      the outer face of each side wall and the outer face of the stiffened panel portion meet at a right angle, and
      the stiffened panel portion has four corners and at each of the four corners two of the side walls meet and form a recess,
    a monolithic aft panel having side walls that extend from outer edges of a main portion, and
    plural corner posts, each corner post overlapping a pair of the side panels which meet at a corner of the external wall structure.

2. A method of manufacturing a satellite, comprising:
  printing a plurality of monolithic wall panels, and a plurality of corner posts configured to form an external wall structure of a satellite, wherein the plurality of monolithic wall panels includes:
    a fore-panel having a stiffened panel portion and side walls that extend from outer edges of the panel portion, wherein the stiffened panel portion and the side walls each have an outer face, the outer face of each side wall and the outer face of the stiffened panel portion meet at a right angle, and the stiffened panel portion has four corners and at each of the four corners two of the side walls meet and form a recess, and
    an aft panel having side walls that extend from outer edges of a main portion,
  assembling the external wall structure of the satellite, including:
    fastening the wall panels to the corner posts such that each corner post overlaps a pair of the wall panels which meet at a corner of the external wall structure, and
    mounting a communication device to the external wall structure, the communication device being configured to receive and transmit data while in space.

3. The method of claim 2, wherein the plurality of wall panels are printed concurrently.

4. The satellite of claim 1, wherein each of the corner posts has two legs, and each leg is fastened to one of the pair of side panels overlapped by the respective corner post.

5. The satellite of claim 4, wherein each corner post is fastened to the side walls of the fore-panel.

6. The satellite of claim 5, wherein each of the side panels is fastened to one of the side walls of the fore-panel.

7. The satellite of claim 4, wherein each leg of the corner posts includes a plurality of apertures, and at least one of the legs is recessed between apertures.

8. The satellite of claim 1, wherein each corner post is disposed interior of the side panels.

9. The satellite of claim 7, wherein one of the plural corner posts has a reinforced leg without recesses, and further including a solar panel, which is fastened to at least one side panel and the reinforced leg of the corner post.

10. The satellite of claim 1, wherein each corner post is received in the recess formed by one of the corners of perpendicularly meeting side walls, between the meeting side walls and the overlapped pair of the side panels.

11. The satellite of claim 10, wherein each side panel is fastened in contact with the outer face of one of the side walls of the fore-panel.

12. The satellite of claim 1, wherein the side walls of the fore and aft panels are scalloped.

13. The satellite of claim 12, wherein each of the scallops of the side walls includes a fastener hole.

14. The satellite of claim 1, wherein the outer face of the stiffened panel portion is a flange of a stiffening structure.

15. The satellite of claim 1, wherein the main portion of the aft panel includes:
  four raised corner portions,
  an aperture in each of the four raised corner portions,
  an outer skin and an inner skin, the outer skin having a contoured cross shape, and
  a central aperture, configured to connect to an interface of a launch vehicle.

16. The satellite of claim 1, wherein the main portion of the aft panel includes an inner skin and an outer skin, wherein the inner skin is planar and the outer skin is convex relative to the inner skin.

17. The satellite of claim 16, wherein the main portion includes an aperture passing through the outer skin and the inner skin, and wherein the outer skin and inner skin are joined by a vertical ring wall, forming an I-beam structure.

18. The satellite of claim 17, wherein the ring wall is further supported by a plurality of fastener columns extending from the outer skin to the inner skin, spaced circumferentially around the ring wall.

19. The satellite of claim 17, wherein the ring wall is configured to connect a propellant tank to the satellite body.

20. The method of claim 2, wherein assembling the external wall structure of the satellite further includes fastening one of the plurality of monolithic wall panels to each of the side walls of the fore-panel.

* * * * *